United States Patent
Salimpour et al.

(10) Patent No.: US 10,158,806 B2
(45) Date of Patent: Dec. 18, 2018

(54) CAMERA SYSTEM AND METHOD FOR ALIGNING IMAGES AND PRESENTING A SERIES OF ALIGNED IMAGES

(71) Applicant: THUMBROLL LLC, Sherman Oaks, CA (US)

(72) Inventors: Ariella Salimpour, Sherman Oaks, CA (US); Michael Gilmore, Anaheim, CA (US); David Swartz, Newport Coast, CA (US); Andrew Maltin, Laguna Beach, CA (US)

(73) Assignee: ThumbRoll LLC, Sherman Oaks, CA (US)

( * ) Notice: Subject to any disclaimer, the term of this patent is extended or adjusted under 35 U.S.C. 154(b) by 0 days.

(21) Appl. No.: 15/256,475

(22) Filed: Sep. 2, 2016

(65) Prior Publication Data

US 2017/0064208 A1    Mar. 2, 2017

Related U.S. Application Data

(60) Provisional application No. 62/213,522, filed on Sep. 2, 2015.

(51) Int. Cl.
*H04N 5/232* (2006.01)
*G06F 3/048* (2013.01)
*G06T 1/00* (2006.01)
*G06F 3/0484* (2013.01)

(52) U.S. Cl.
CPC ....... *H04N 5/23293* (2013.01); *G06F 3/0484* (2013.01); *G06T 1/0007* (2013.01); *H04N 5/23216* (2013.01); *H04N 5/23245* (2013.01); *G06F 2203/04804* (2013.01)

(58) Field of Classification Search
CPC ........... H04N 5/23293; H04N 5/23254; H04N 5/23245; G06F 3/0484; G06F 3/0488; G06F 2203/04804; G06T 1/0007
USPC ............ 348/333.03, 333.02, 333.01, 333.05, 348/333.11, 333.12, 222.1, 95, 326,
(Continued)

(56) References Cited

U.S. PATENT DOCUMENTS

| 5,029,997 A | 7/1991 | Faroudja |
| 5,805,289 A | 9/1998 | Corby, Jr. et al. |
| 7,782,384 B2 | 8/2010 | Kelly |

(Continued)

OTHER PUBLICATIONS

Overlapse-Timelapse Made Easy, Publication Date Sep. 14, 2014, Inventor Overlaps Inc., http://windowsphoneapks.com/APK_Overlapse-Timelapse-Made-Easy_Windows-Phone_html.

(Continued)

*Primary Examiner* — Marly S Camargo
(74) *Attorney, Agent, or Firm* — Lewis Roca Rothgerber Christie LLP

(57) ABSTRACT

A camera system includes a processor, a camera coupled to the processor, a display coupled to the processor, and a memory storing instructions that, when executed by the processor, cause the processor to store a first image in the memory, modify the first image to generate a modified first image, the modified first image corresponding to the first image at a reduced opacity, control the camera to capture a real-time preview, overlay the modified first image on the real-time preview to generate a combined preview, output the combined preview to the display, capture a second image using the camera, and store the second image in the memory.

6 Claims, 26 Drawing Sheets

(58) Field of Classification Search
USPC .......... 348/231.2, 231.6, 239; 382/151, 184, 382/163, 287, 284, 294
See application file for complete search history.

(56) References Cited

U.S. PATENT DOCUMENTS

| | | | |
|---|---|---|---|
| 9,049,417 | B2 | 6/2015 | Nakagawa |
| 2001/0033303 | A1* | 10/2001 | Anderson ......... G06F 17/30277 715/854 |
| 2005/0024517 | A1 | 2/2005 | Luciano |
| 2006/0098112 | A1 | 5/2006 | Kelly |
| 2006/0120623 | A1 | 6/2006 | Tsukamoto et al. |
| 2009/0245691 | A1 | 10/2009 | Naimark et al. |
| 2011/0082667 | A1 | 4/2011 | Ibarz et al. |
| 2011/0317034 | A1 | 12/2011 | Athreya et al. |
| 2013/0315578 | A1 | 11/2013 | Arin et al. |
| 2014/0104315 | A1 | 4/2014 | Kapler et al. |
| 2015/0043893 | A1 | 2/2015 | Nishizaka |
| 2015/0070523 | A1 | 3/2015 | Chao |
| 2016/0057363 | A1* | 2/2016 | Posa .................... H04N 5/272 348/239 |

OTHER PUBLICATIONS

PhotoChron—timelapse selfie, Release Apr. 24, 2015, Inventor Andy Dyer-Smith,—http://appscout.pcmag.com/android/301119-photochron-for-android-simple-time-lapse-portraits.
International Search Report and Written Opinion for International Application No. PCT/US16/50294, dated Feb. 7, 2017, 16 pages.

* cited by examiner

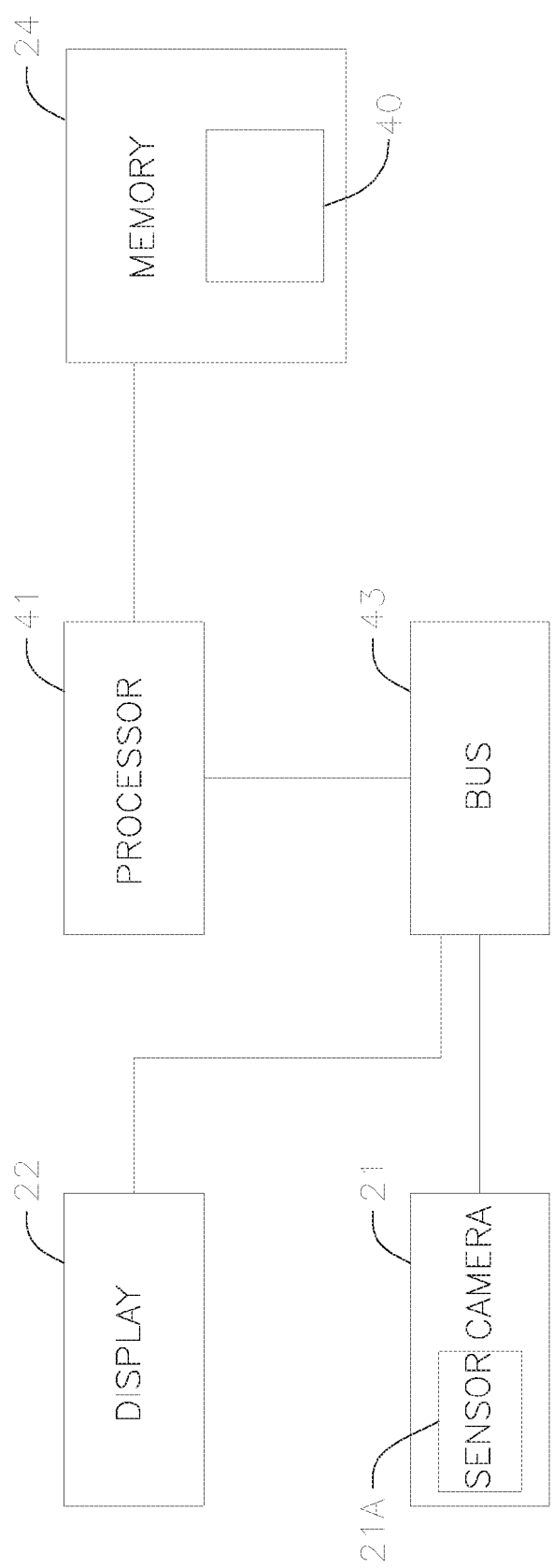

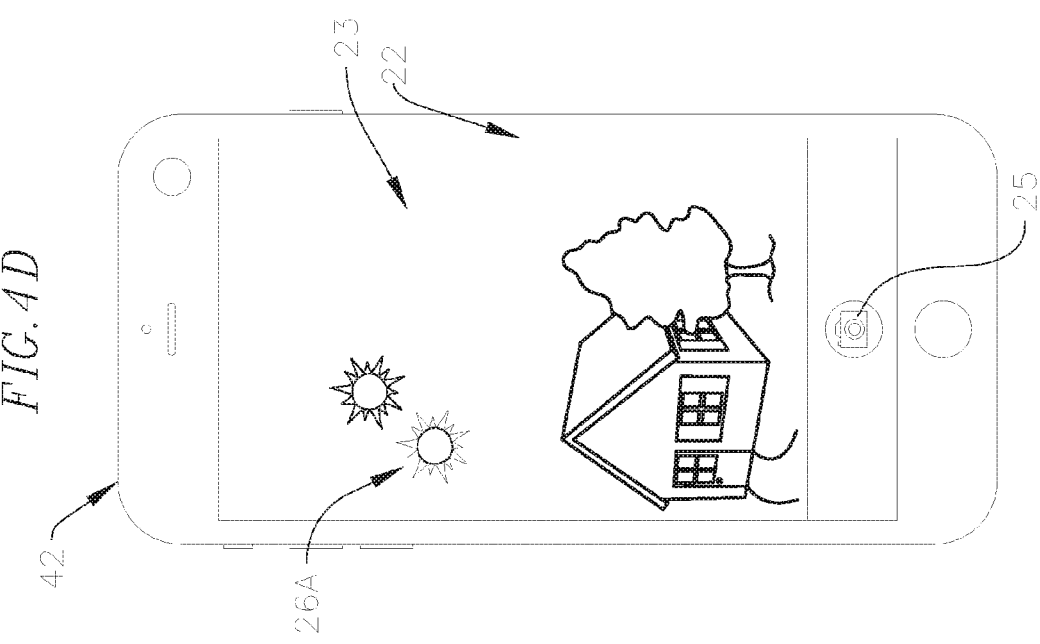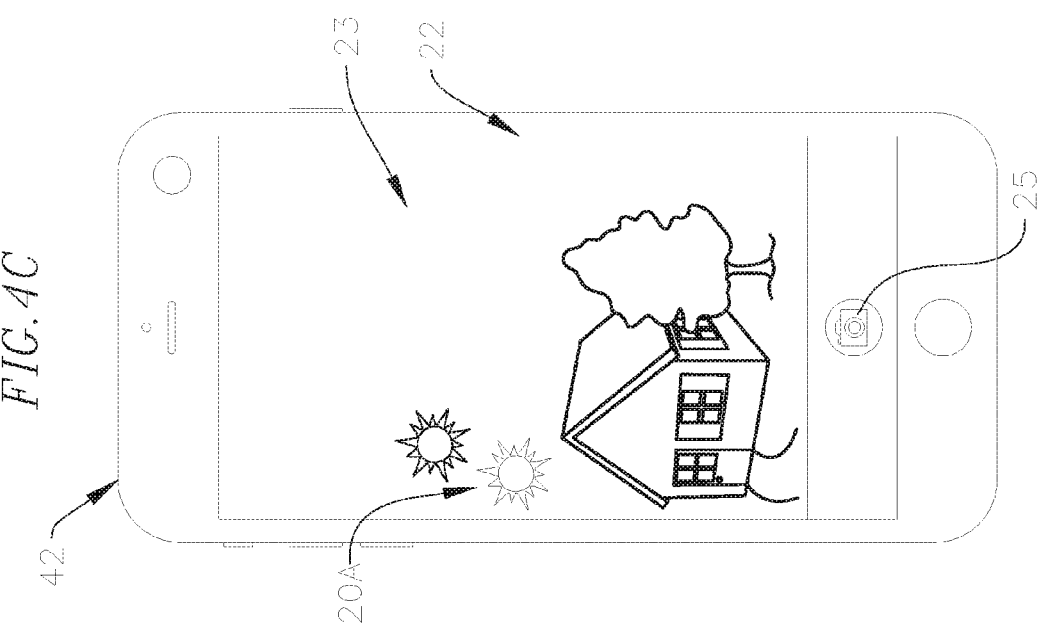

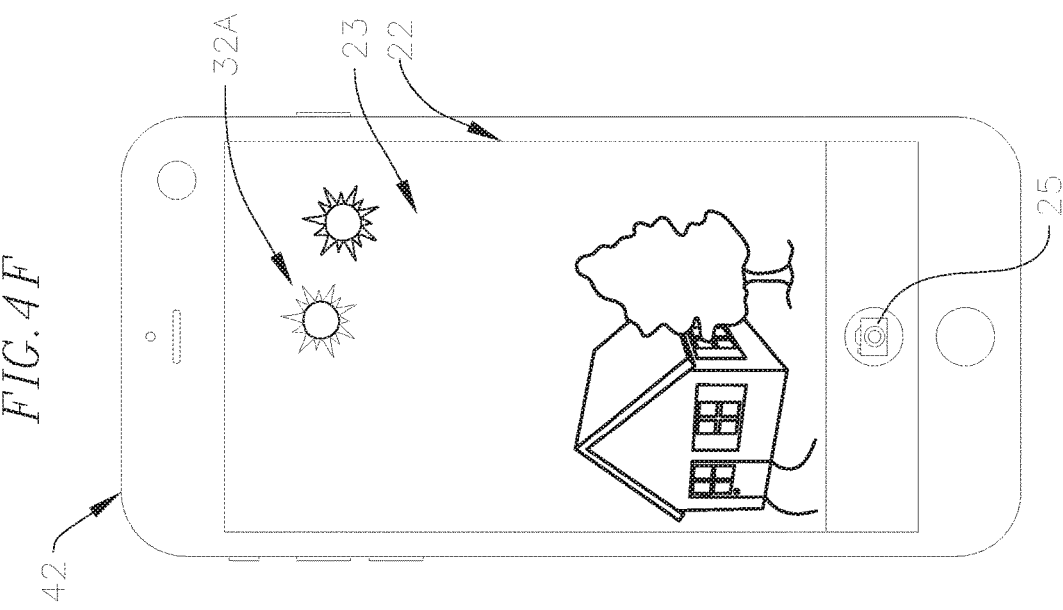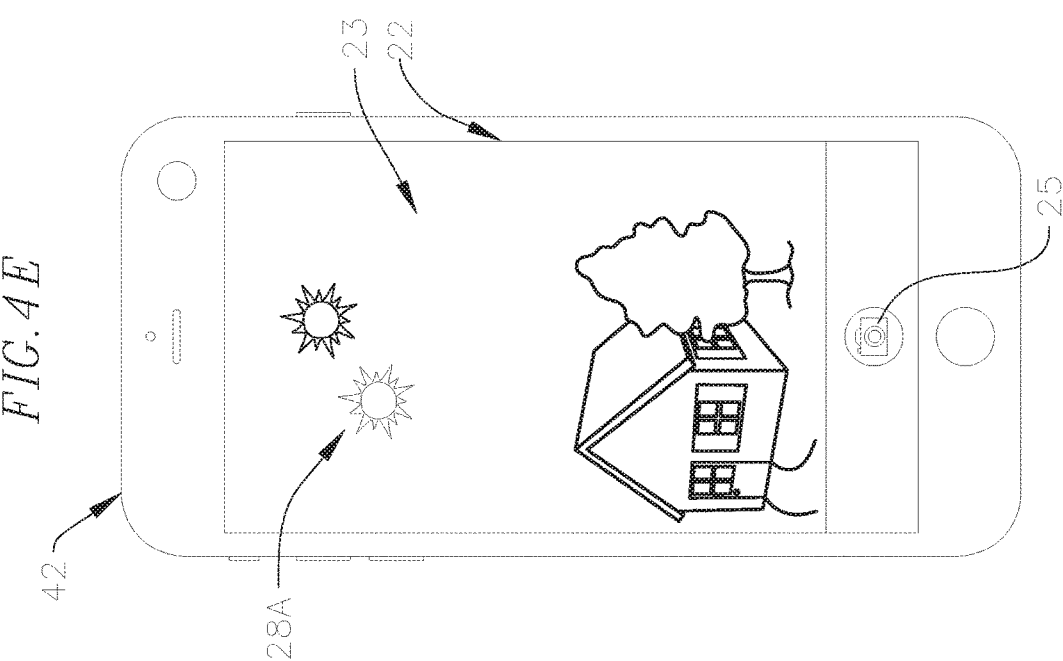

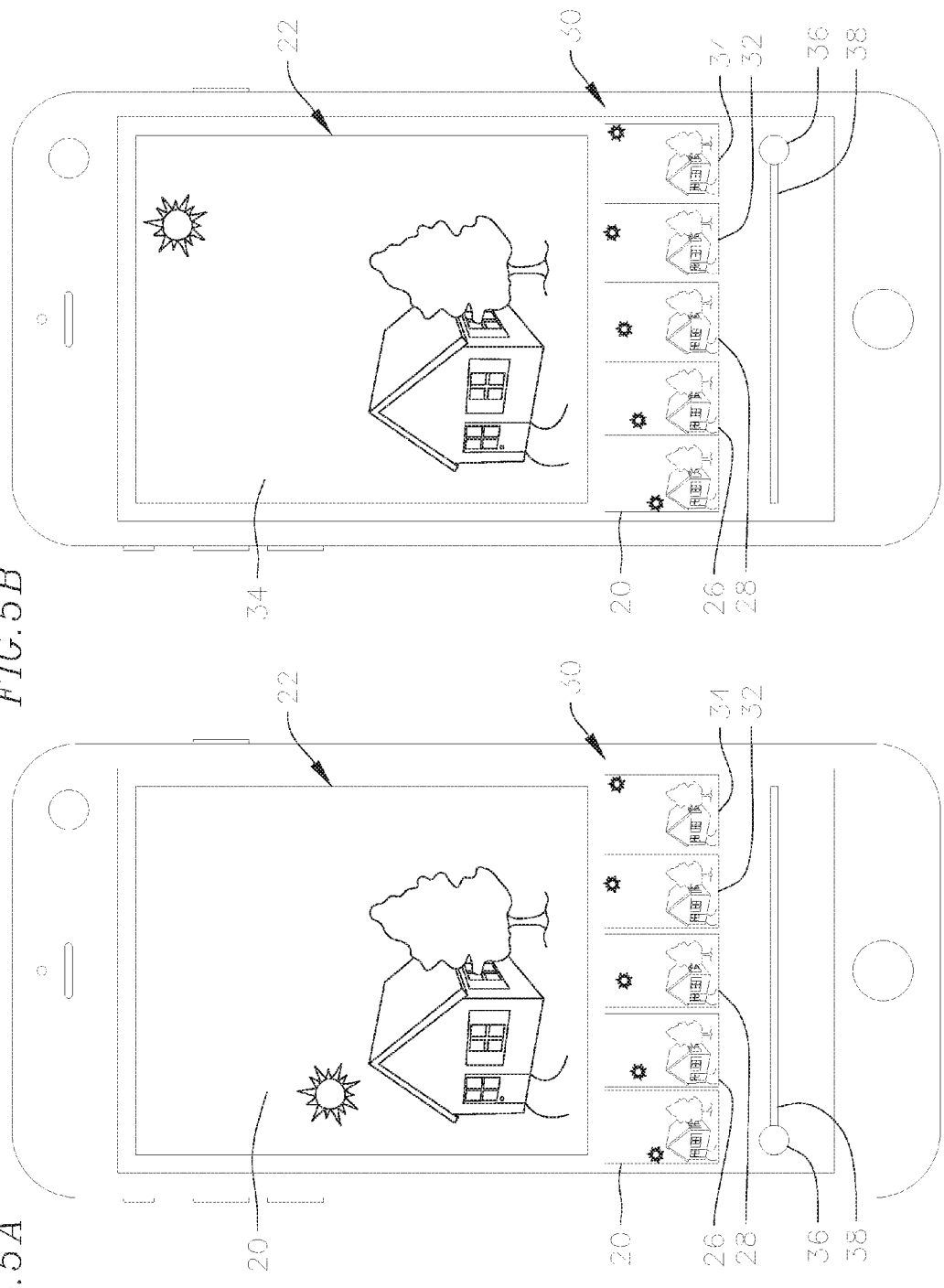

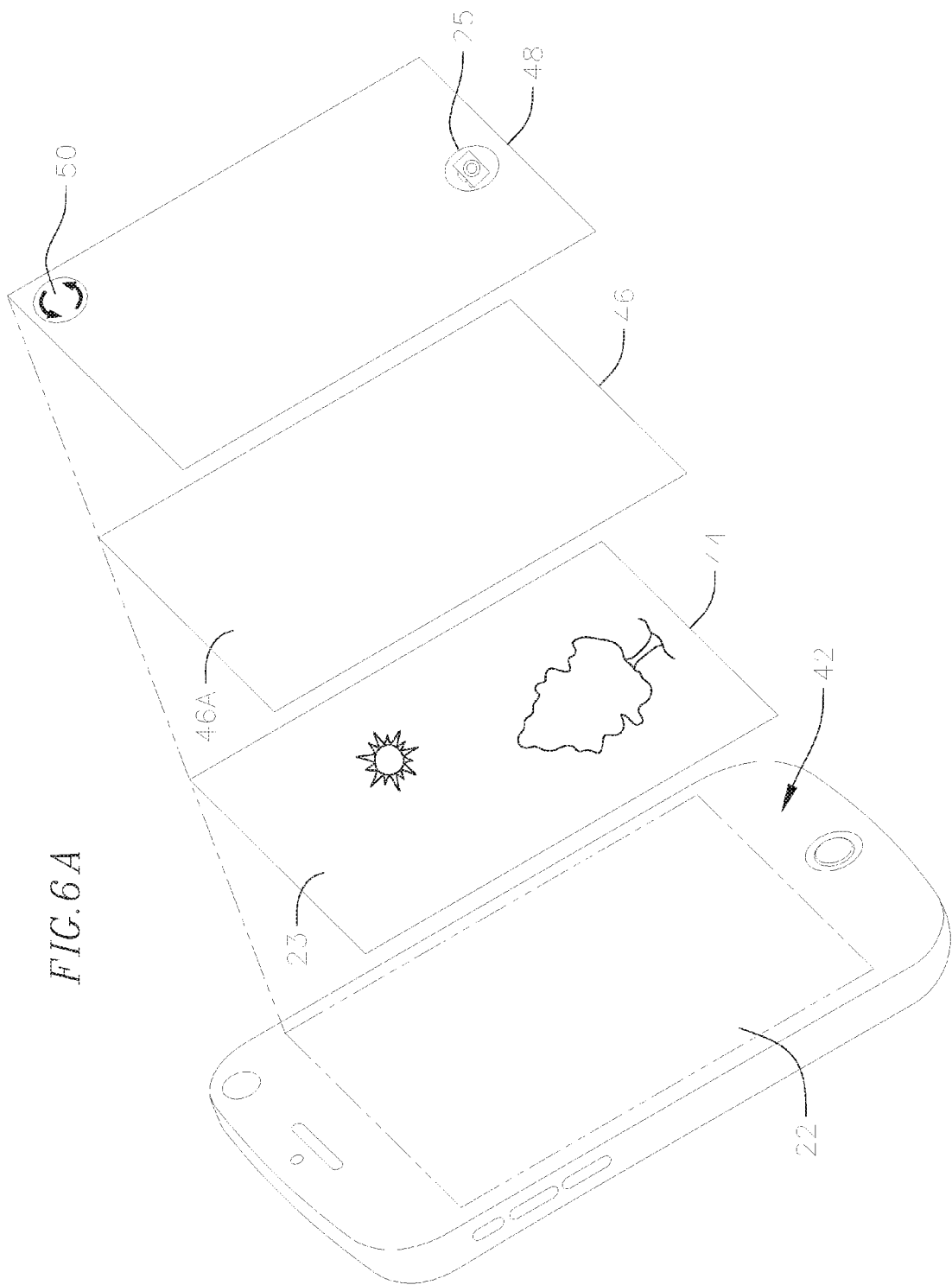

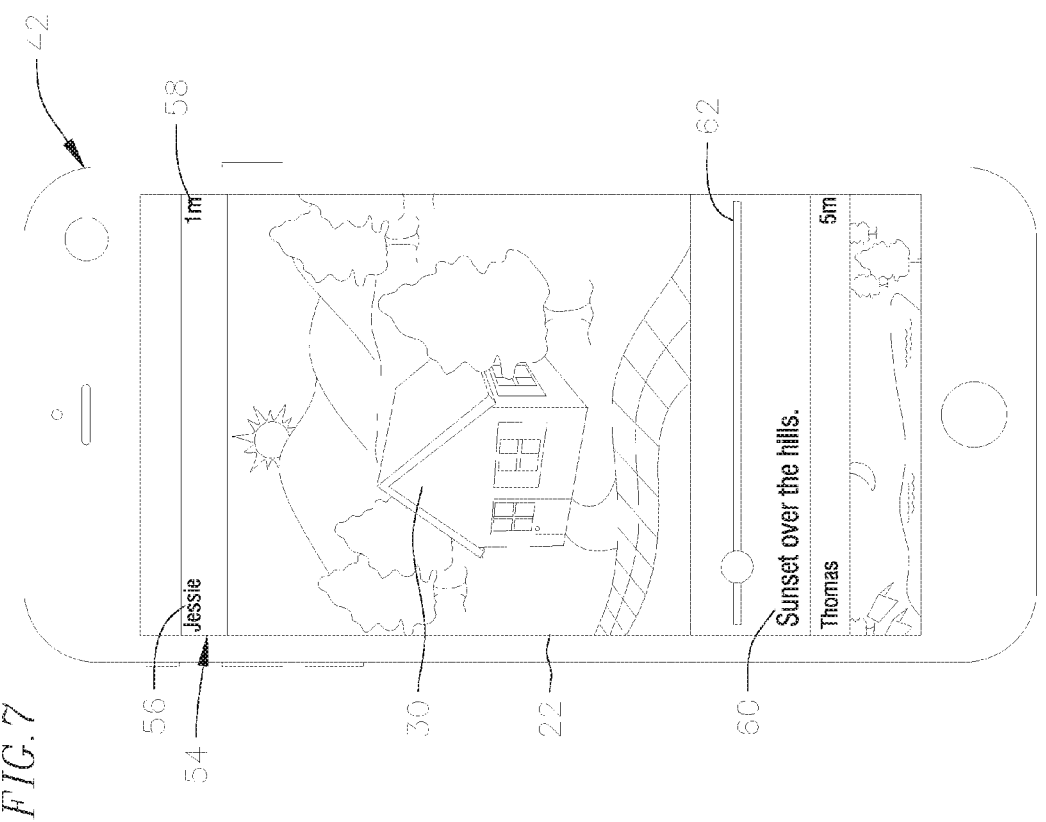

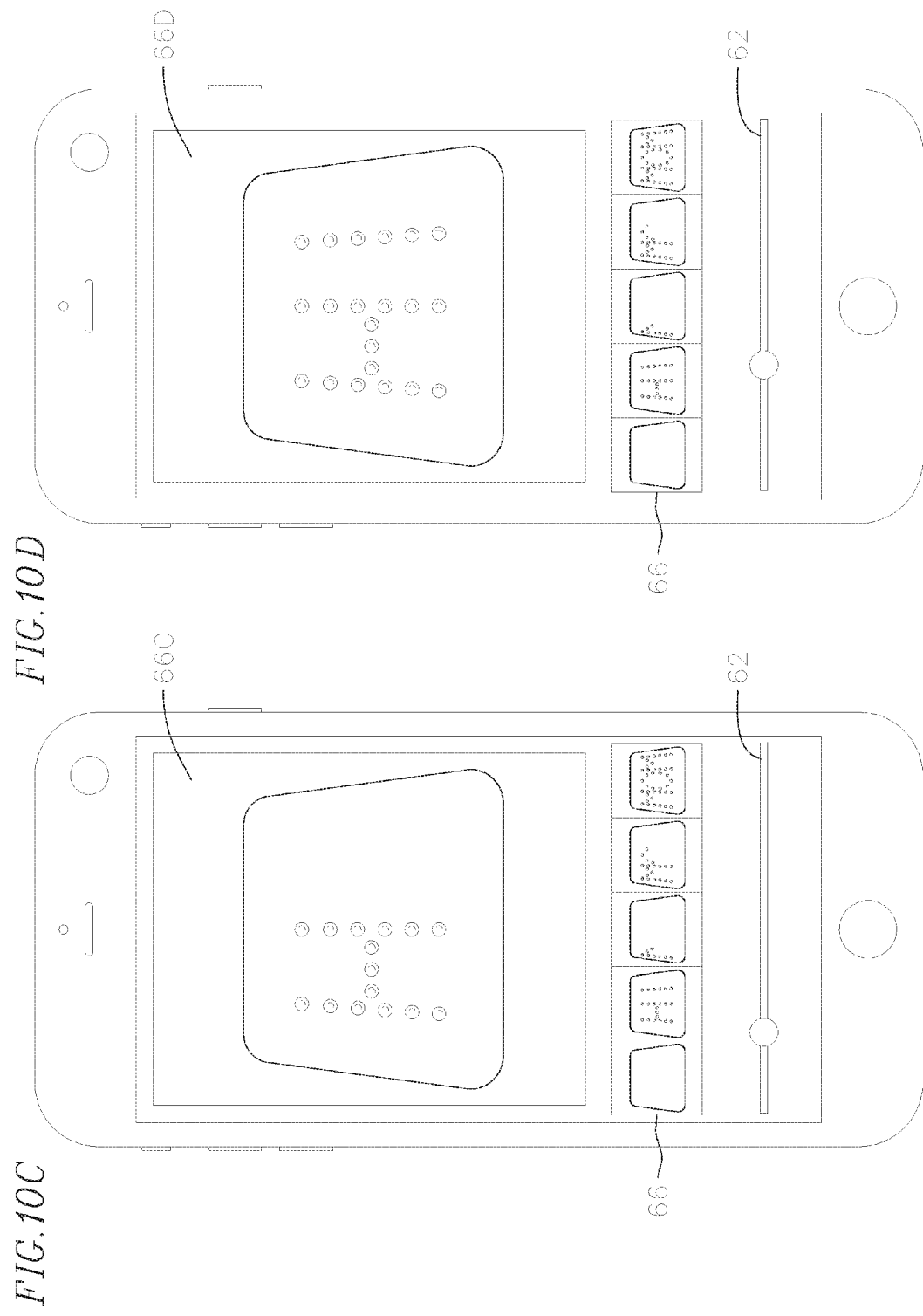

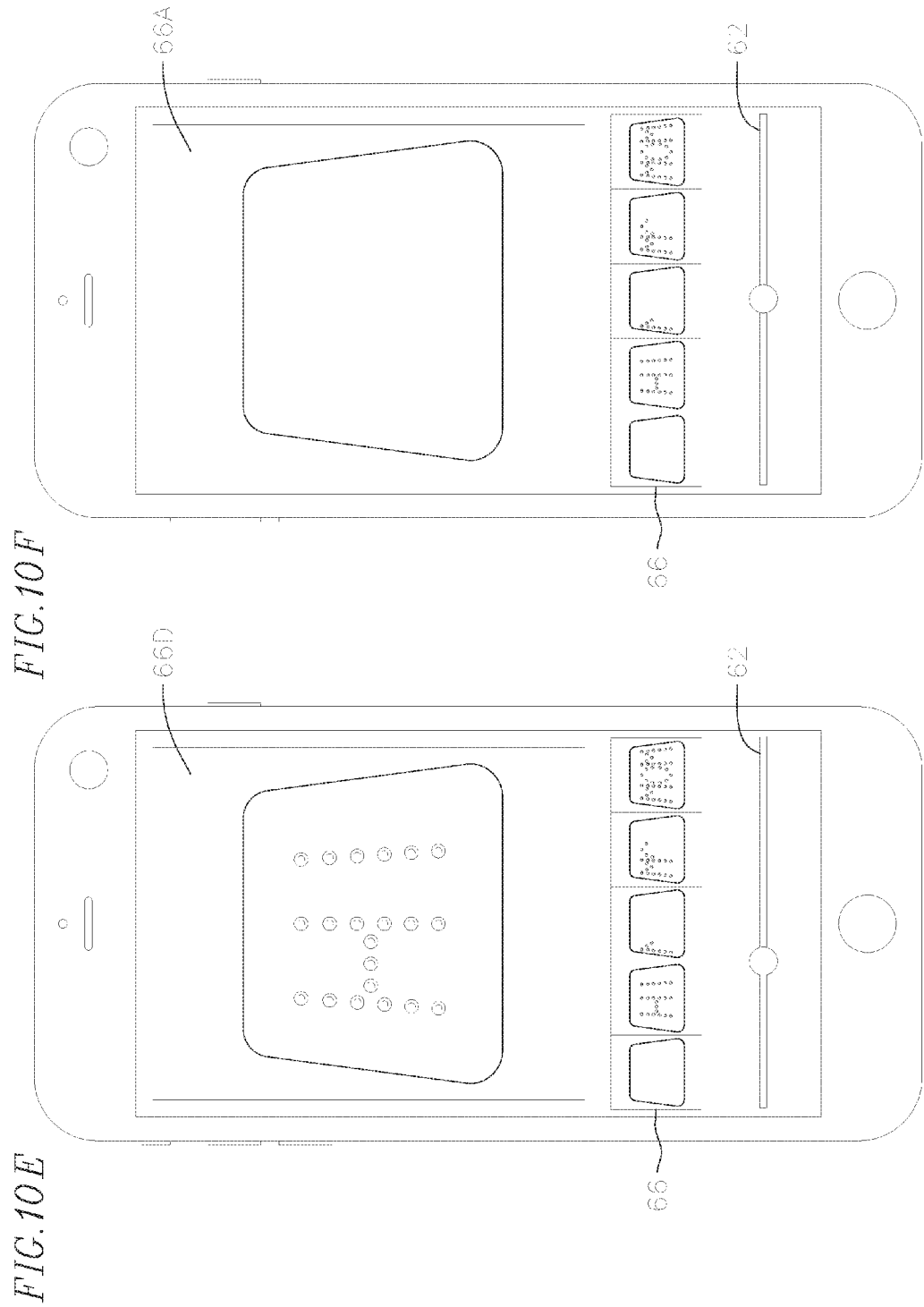

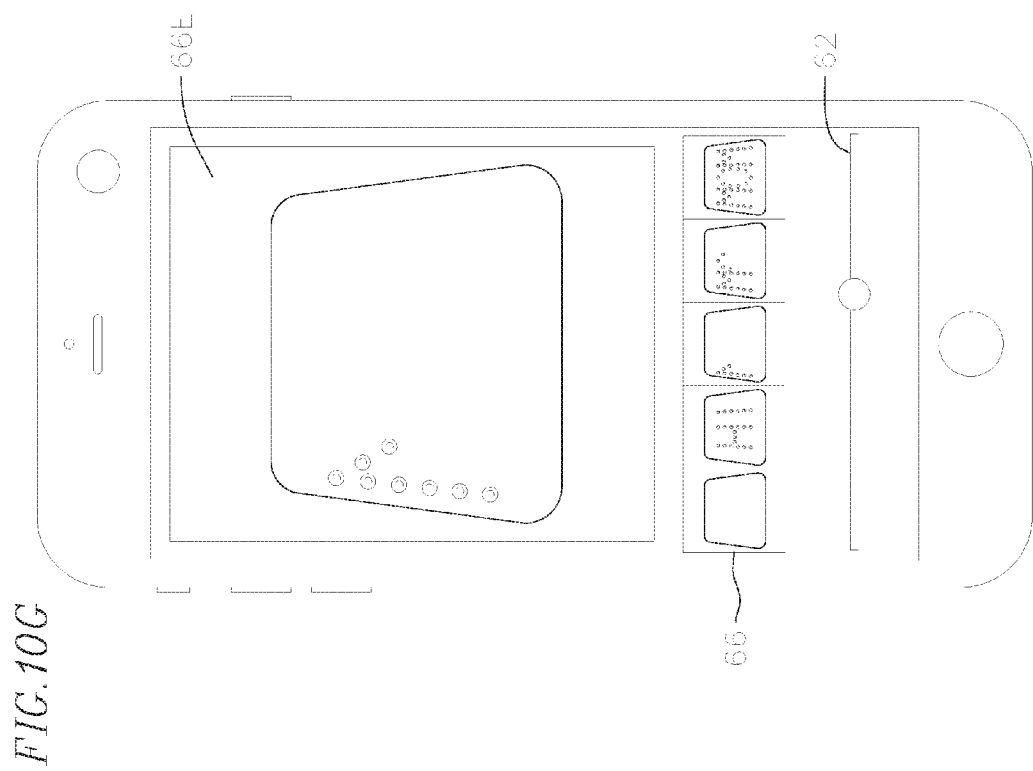

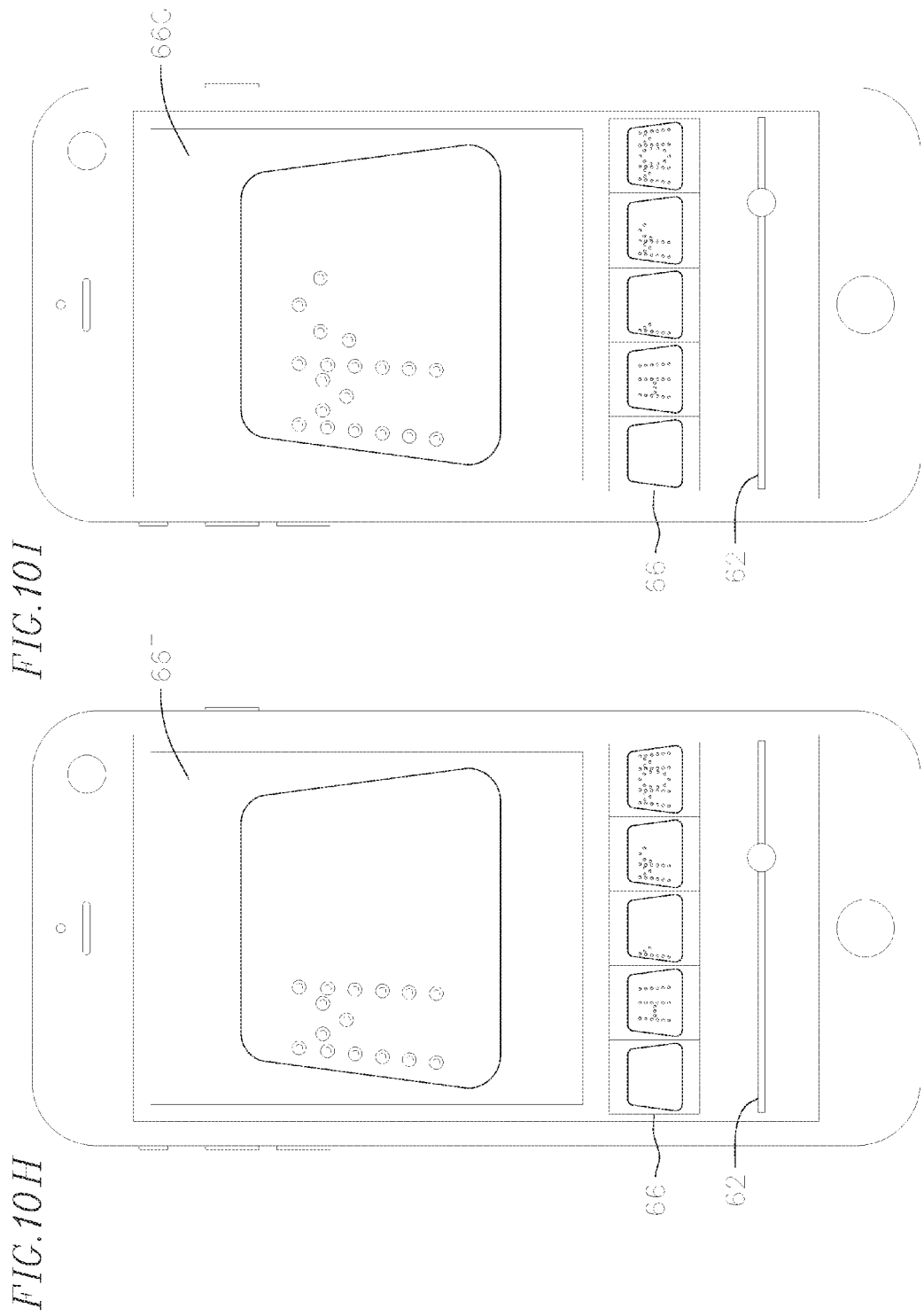

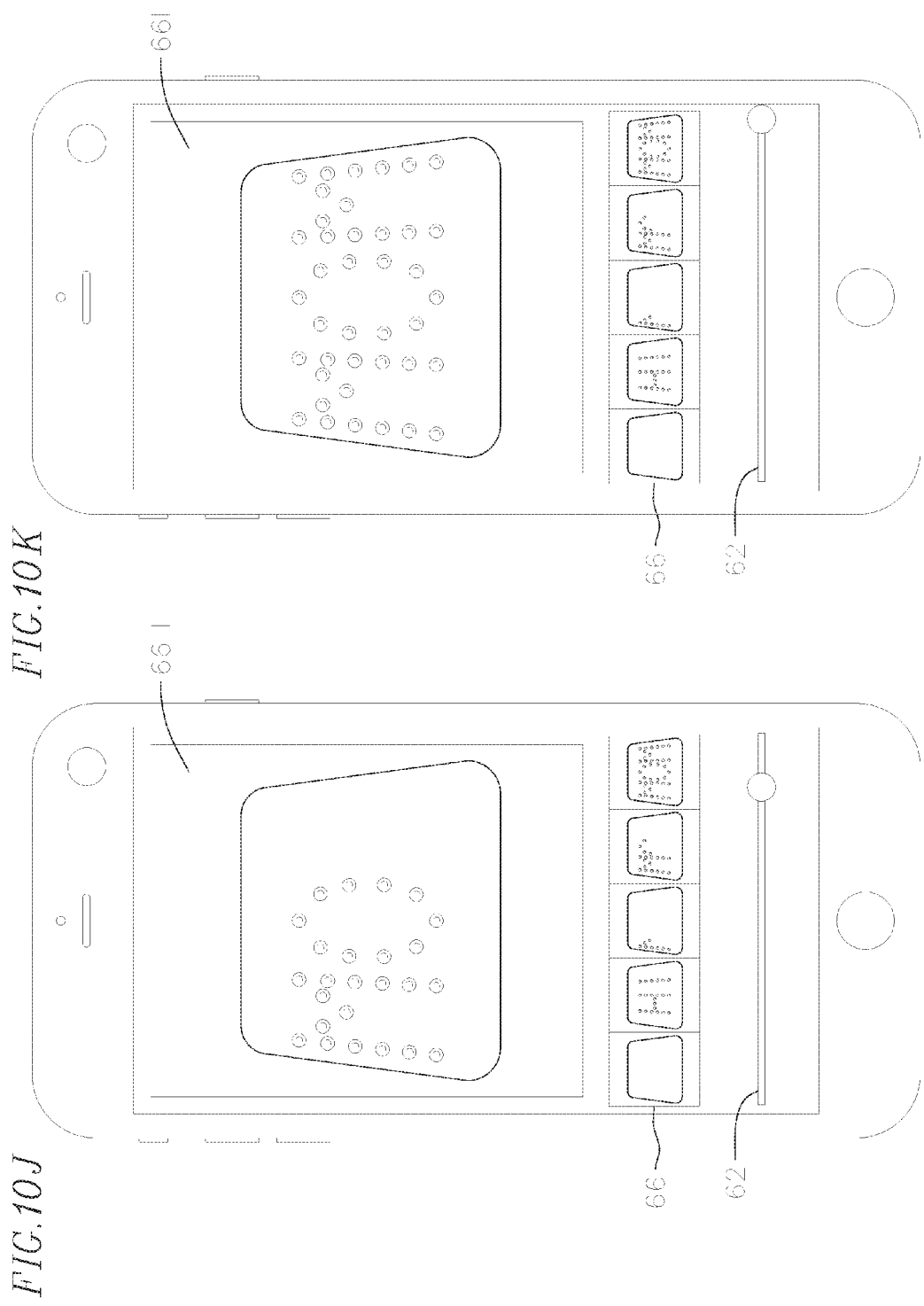

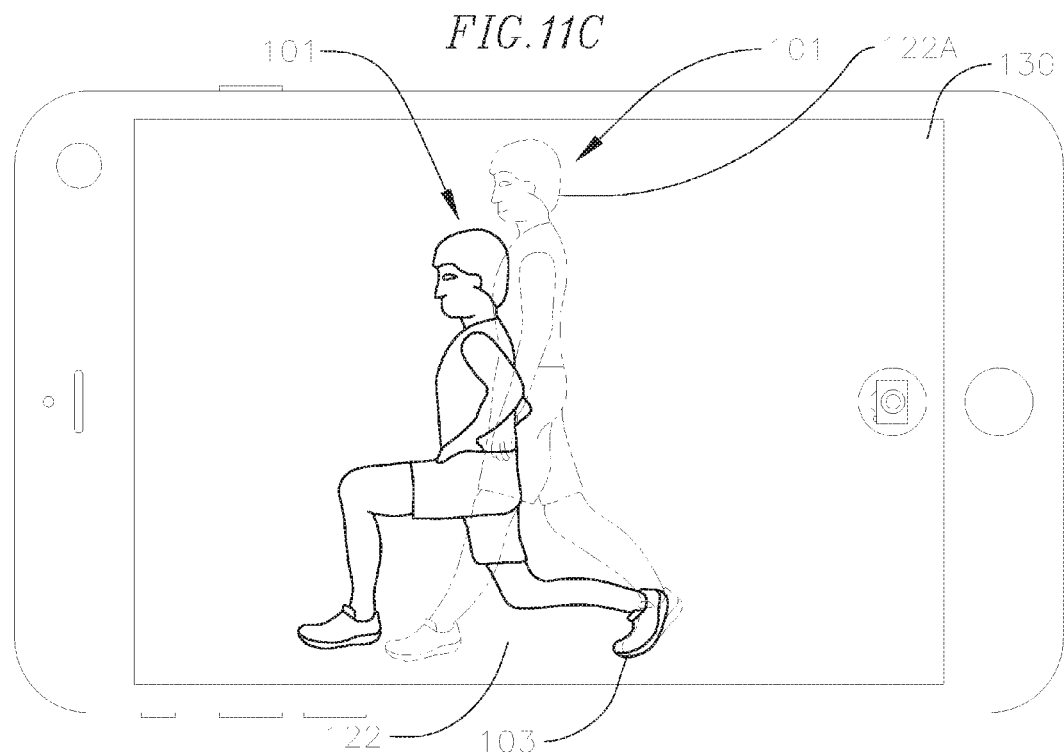
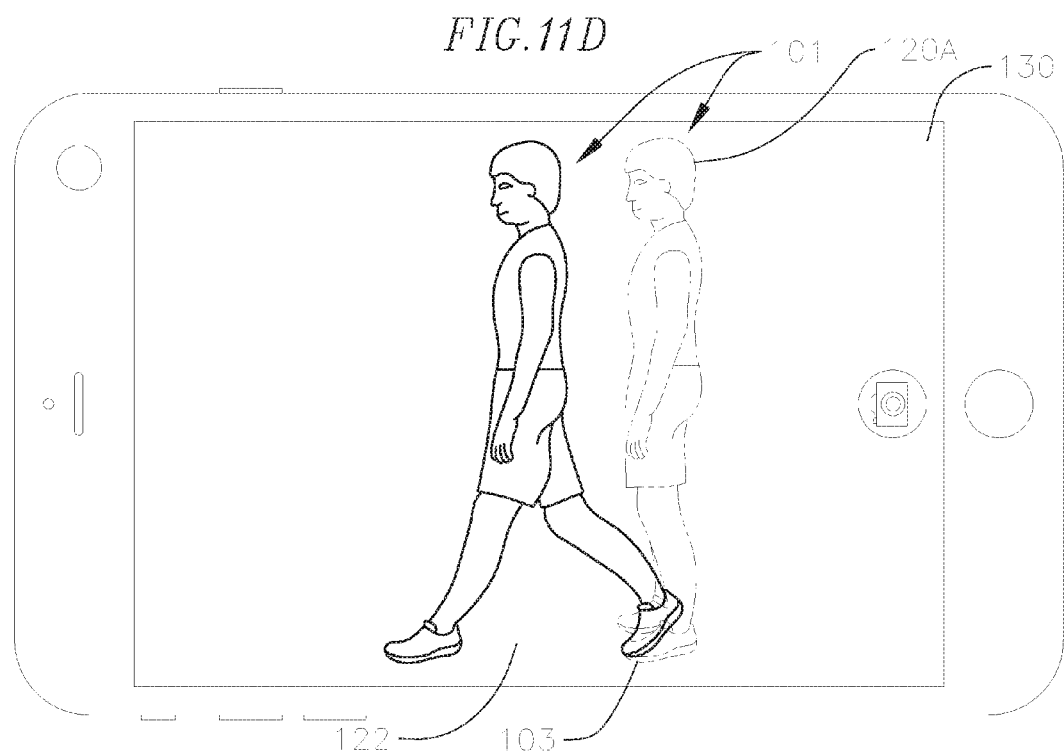

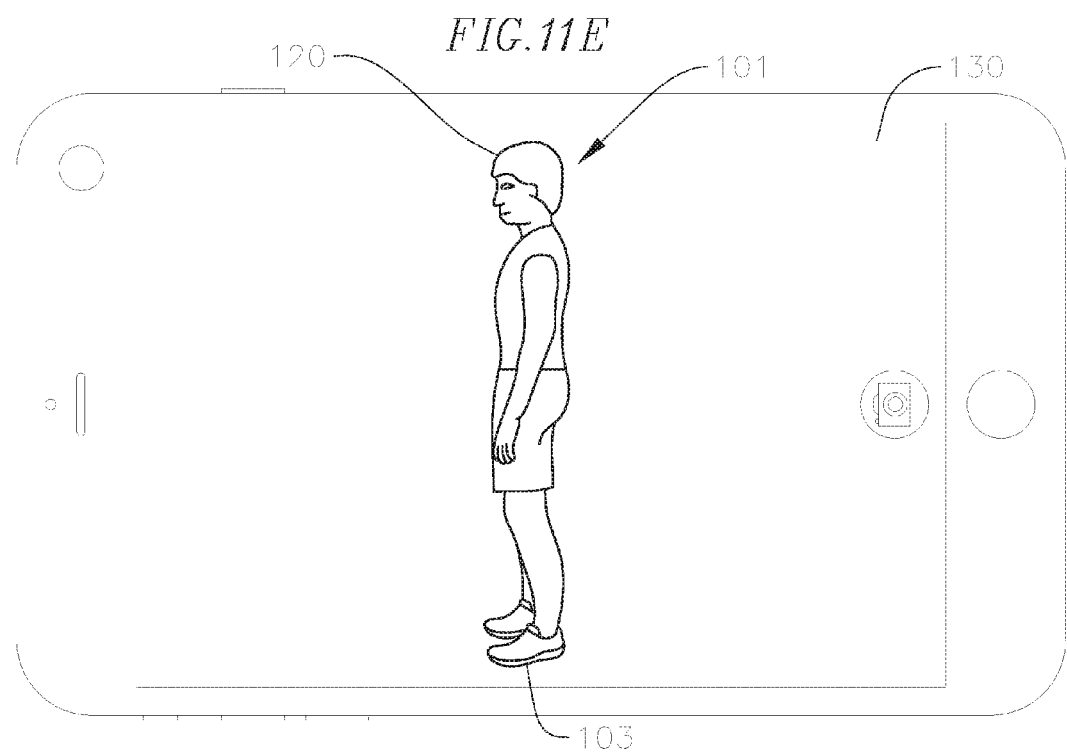

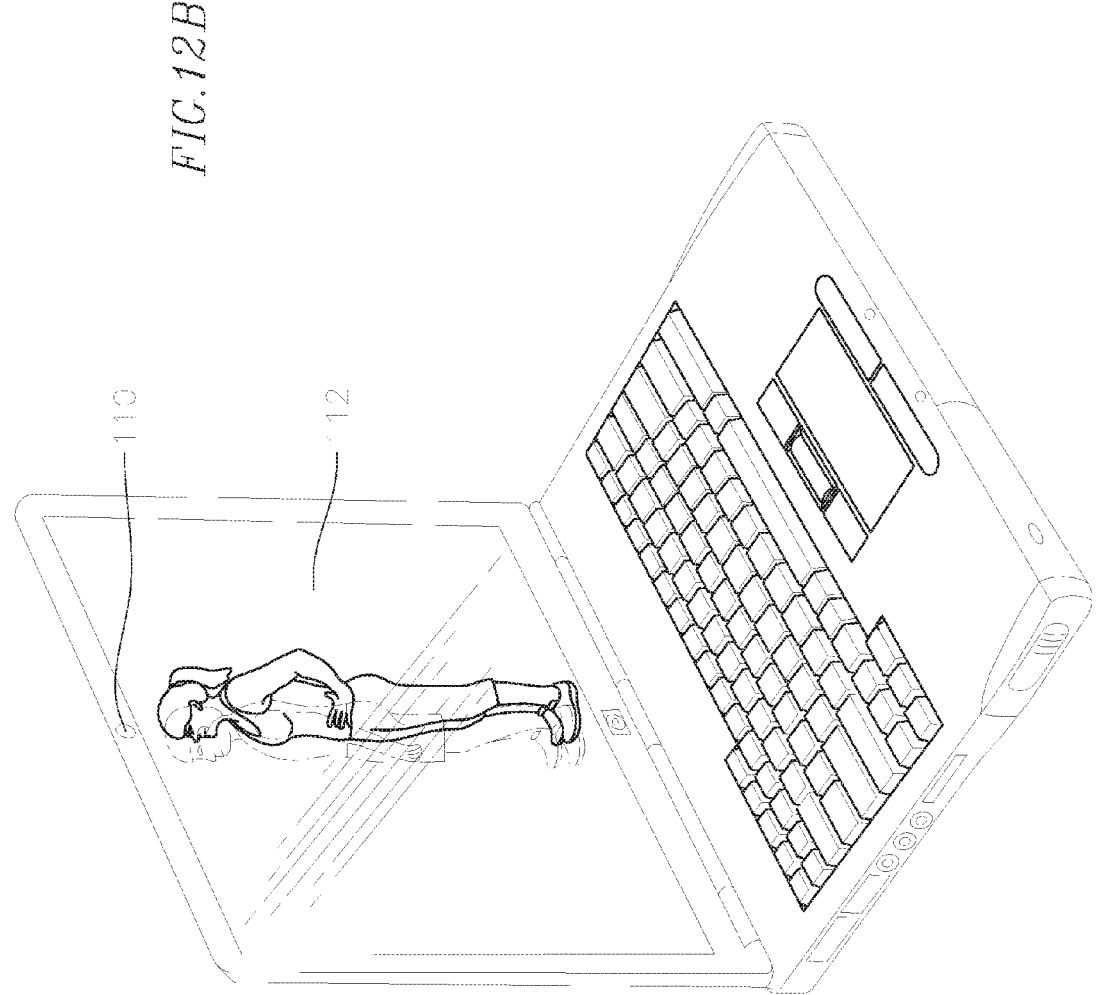

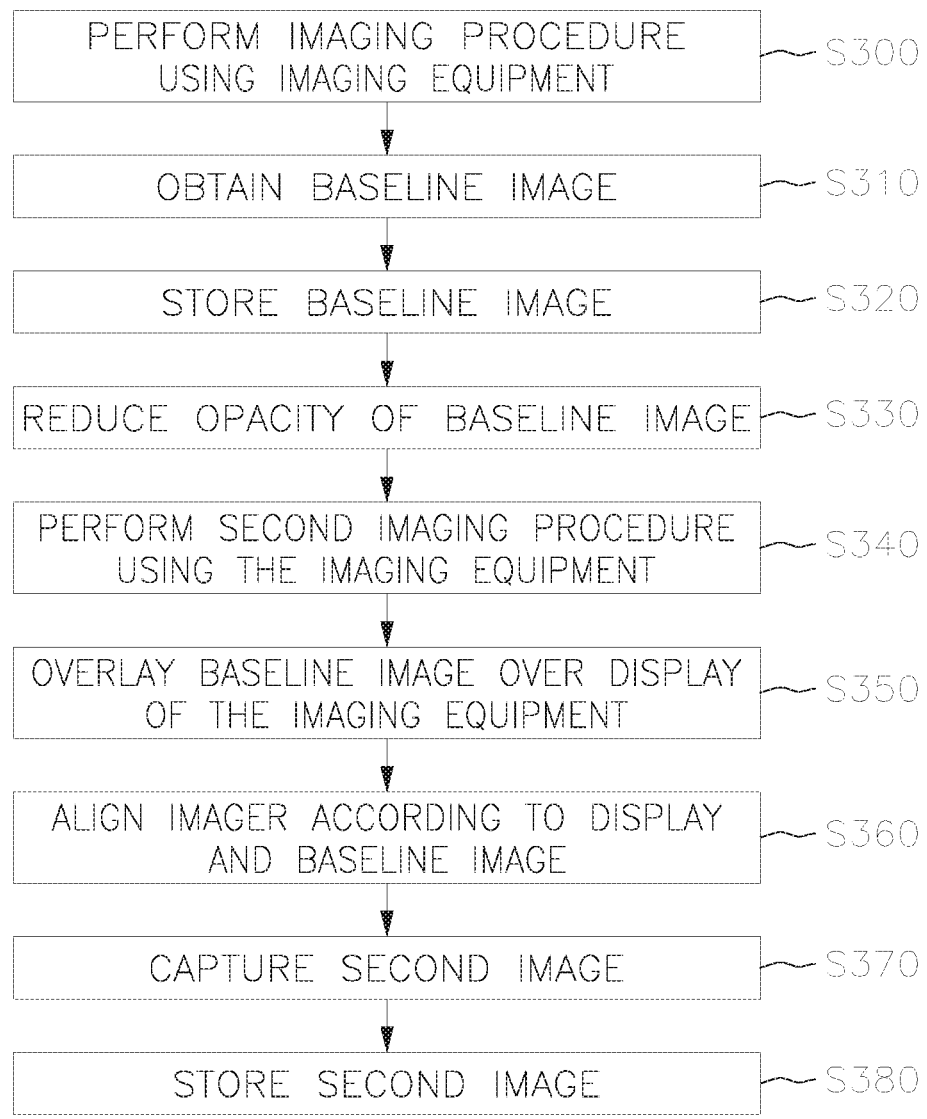

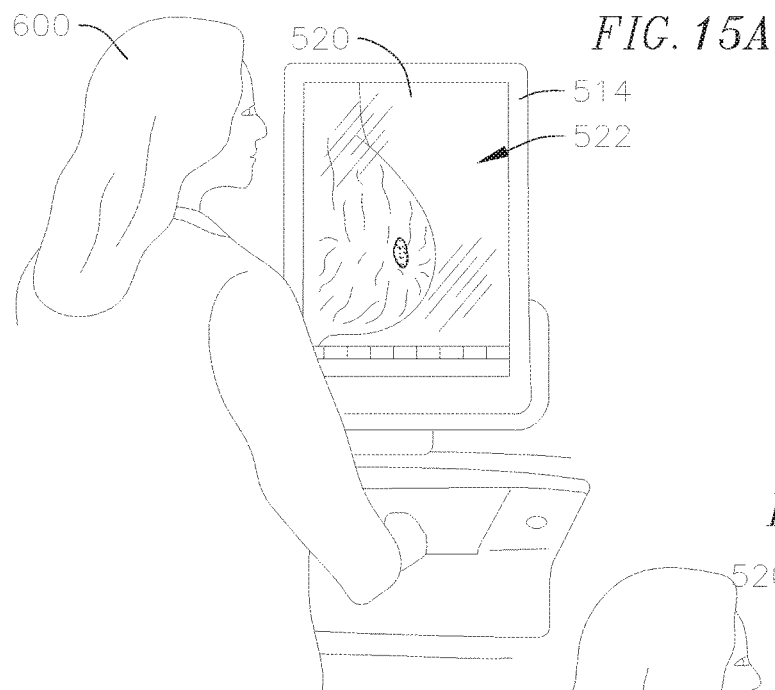
FIG. 15A
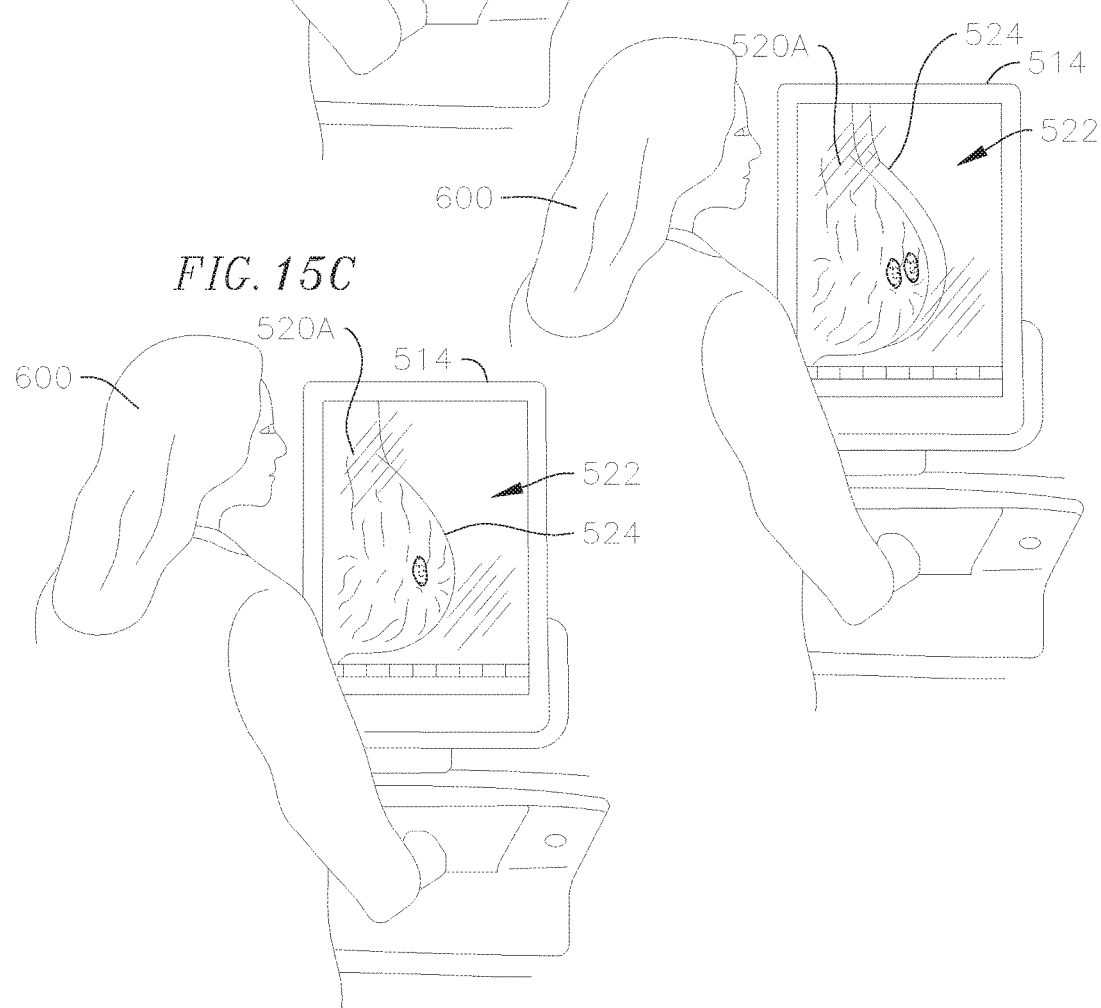
FIG. 15B
FIG. 15C

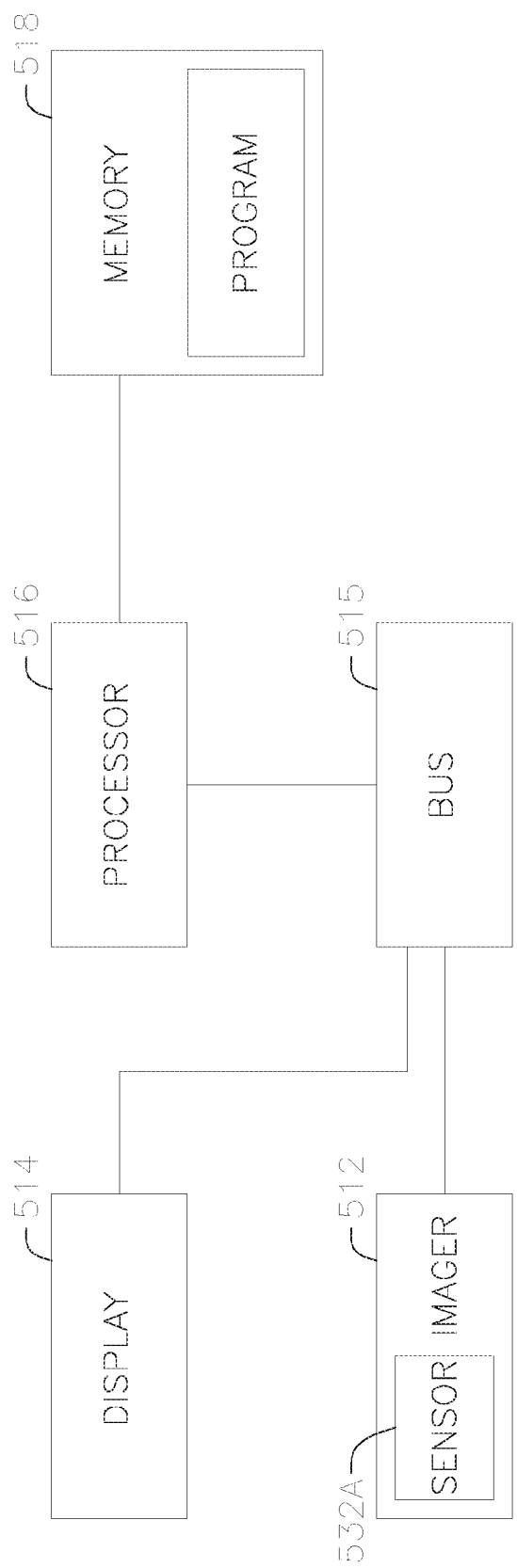

CAMERA SYSTEM AND METHOD FOR ALIGNING IMAGES AND PRESENTING A SERIES OF ALIGNED IMAGES

CROSS-REFERENCE TO RELATED APPLICATION

This application claims the benefit and the priority of U.S. Provisional Patent Application No. 62/213,522 filed Sep. 2, 2015, the entire content of which is incorporated herein by reference.

BACKGROUND

1. Field

The present disclosure relates generally to the field of image capture, and more particularly to a camera system and method for aligning images and presenting a series of aligned images.

2. Description of the Related Art

With the development of smartphones, many of which include a built-in camera, the popularity of cameras and amateur photography has significantly increased, specifically digital photography. In digital photography, a camera including an array of electronic photodetectors is used to capture an image, as opposed to traditional film photography, where a strip of film is used to capture an image. In analog photography, an image is imprinted on light-sensitive film (also called a negative) which is then used to produce a photograph on paper. Although a negative on a used roll of film may be viewed once the roll of film is removed from a camera, film photography does not provide a user with any feedback until the film is removed from the camera and/or is developed.

In digital photography, because an image is captured and stored electronically, the image that has been captured may often be reviewed on a viewing screen (e.g., a liquid crystal display (LCD) screen on the camera or a screen on a smartphone) shortly after the image has been captured. In addition, many digital cameras may be used to take video (e.g., a constant stream of images, with or without sound).

Both film and digital cameras may be used to construct a time-lapse, or a sequence of frames (or images) captured at set intervals to record changes that take place over time. The frames may be shown at a normal speed, a reduced speed, or an enhanced speed to depict change of a particular object, scene, etc. over time. A time-lapse typically requires use of a tripod or markers to properly align the camera to create consistency between images. However, with both digital and film cameras, the user cannot concurrently compare a previously captured image with a currently framed image. As such, it can be difficult to create a time-lapse of photographs taken over a prolonged period of time and/or in a public setting because it may be difficult or impossible to leave the tripod or markers in the same position or on a viewfinder of the camera, or the tripod may be needed to capture unrelated images and thus the user would need to move the tripod or purchase multiple tripods. Further, it can be difficult or impossible to take a time-lapse with relatively smooth transitions of non-stationary objects, for example, of a person's face, as the person will not maintain one orientation relative to the tripod or markers over a prolonged period of time.

In many instance, there may be a desire to align and/or compare subsequently captured images without the use of a time-lapse style sequence. For example, cameras are often used to capture photographs of children at different stages of life, such as birthdays. However, it can be difficult for a viewer to view and appreciate the similarities and differences between distinct images when each image is captured from a different perspective. Typically, a mark is drawn on the wall, or a mark may be made on a viewfinder to provide some sort of reference point, but these do not indicate appropriate depth, angle, etc.

In addition, many procedures in the medical field require comparison of measurements taken at distinct points in time. For example, skin cancer is often detected by measuring changes in size, shape, and/or color of a patient's moles on their skin. Similarly, breast cancer is detected by measuring changes in size and shape of irregularities inside a patient's breast using X-ray imaging of the breast. Although there are general guidelines for assessing normal sizes, shapes, etc., changes in a patient are often the most critical for providing a diagnosis. However, it can be difficult to compare different screenings or test results taken at a first time and a second time for a plurality of reasons. For example, it may be difficult to properly align imaging equipment relative to the patient, resulting in a variation in angle and portion of the patient that is imaged. Similarly, it may be difficult to orient the patient relative to the imaging equipment. Further, it may be difficult to recognize minute differences in size, shape, etc. when the first test results and the second test results are compared side by side. As such, diagnoses are often limited by the quality of the test results and the ability of the physician to compare test results taken at different points in time.

SUMMARY

One or more embodiments of the present disclosure are directed to a camera system including a processor, a camera coupled to the processor, a display coupled to the processor, and a memory storing instructions that, when executed by the processor, cause the processor to store a first image in the memory, modify the first image to generate a modified first image, the modified first image corresponding to the first image at a reduced opacity, control the camera to capture a real-time preview, overlay the modified first image on the real-time preview to generate a combined preview, output the combined preview to the display, capture a second image using the camera, and store the second image in the memory.

In some embodiments, the instructions may further cause the processor to show a real-time preview of the first image on the display, and control the camera to capture the first image.

In some embodiments, the memory may further store instructions that, when executed by the processor, cause the processor to orient the camera in a first orientation to capture the first image and in the first orientation to capture the second image.

In some embodiments, the modified first image may be stored in the memory.

In some embodiments, the processor may reduce the opacity of the first image by 40%.

In some embodiments, the display may be configured to concurrently display a plurality of layers.

In some embodiments, the plurality of layers may include a user interface view layer configured to display the real-time preview, and an overlay layer configured to display an image stored in the memory.

In some embodiments, the instructions may further cause the processor to show a real-time preview on the user interface view layer, display a transparent layer in the overlay layer, and capture the first image using the camera.

In some embodiments, the camera system may further include a controller layer comprising an icon.

In some embodiments, the camera system may be configured to send a signal to the processor when the icon is engaged.

In some embodiments, the second image may be captured by taking a screenshot of the real-time preview of the second image.

In some embodiments, the processor, the camera, the display, and the memory may be components of a smartphone.

In some embodiments, the camera may include an image sensor and a lens configured to focus light onto the image sensor.

In some embodiments, the camera may include medical imaging equipment.

In some embodiments, the medical imaging equipment may include one of X-ray equipment, MRI equipment, a PET scanner, a CT scanner, ultrasound equipment, an echocardiography machine, or a mammography machine.

One or more embodiments of the present disclosure are directed to a display system for presenting a series of aligned images, the display system including a processor, a display coupled to the processor, a user interface device for sending a signal to the processor, and a memory storing instructions that, when executed by the processor, cause the processor to store a plurality of images in the memory, assign values to each of the images according to an order of the images from among the plurality of images in the memory, such that a first value corresponds to a first image and a second value corresponds to a second image, the first image being ordered before the second image, correlate the values to portions of a transport controller, display the first image and the transport controller on the display, receive an input from the user interface device corresponding to a portion of the transport controller corresponding to the second value, and display the second image according to the second input.

In some embodiments, the transport controller may include a virtual button that is slidable along a virtual bar on the display.

In some embodiments, the user interface device may include a mouse, a touch screen integrated with the display, a touchscreen external to the display, a track ball, or a stylus.

In some embodiments, the transport controller may be a virtual button that is slidable along a circular path.

In some embodiments, one revolution of the transport controller may display each of the images of the plurality of images.

In some embodiments, the plurality of images may each be displayed at their native resolutions.

One or more embodiments of the present disclosure are directed to a method of capturing an image, the method comprising storing a first image in a memory of a device in communication with a camera and having a memory, overlaying a modified first image on a real-time preview shown on the display, the modified first image corresponding to the first image at a reduced opacity, capturing a second image using the camera, and storing the second image in the memory.

BRIEF DESCRIPTION OF THE DRAWINGS

These and other features and aspects of embodiments of the present disclosure will be better understood by reference to the following detailed description, when considered in conjunction with the accompanying drawings. Like numbers are used throughout the figures to reference like features and components. The figures are schematic in nature and may not be drawn to scale.

FIG. 3 is a block diagram of a system for capturing images according to one embodiment of the present disclosure.

FIG. 4C is a front elevational view of the smartphone of FIG. 4A displaying the preview and the first alignment overlay image in an aligned configuration according to one or more embodiments of the present disclosure.

FIG. 4D is a front elevational view of the smartphone of FIG. 4A displaying a preview and a second alignment overlay image in an aligned configuration according to one or more embodiments of the present disclosure.

FIG. 4E is a front elevational view of the smartphone of FIG. 4A displaying a preview and a third alignment overlay image in an aligned configuration according to one or more embodiments of the present disclosure.

FIG. 4F is a front elevational view of the smartphone of FIG. 4A displaying a preview and a fourth alignment overlay image in an aligned configuration according to one or more embodiments of the present disclosure.

FIG. 5A is a front elevational view of the smartphone of FIG. 4A displaying a first image of a project and a transport controller according to one or more embodiments of the present disclosure.

FIG. 5B is a front elevational view of the smartphone of FIG. 4A displaying a fifth image of the project and the transport controller according to one or more embodiments of the present disclosure.

FIG. 6A is an exploded perspective view of a program with an initial alignment layer in an alignment layer according to one or more embodiments of the present disclosure.

FIG. 7 is a front elevational view of a feed of a program according to one or more embodiments of the present disclosure.

FIGS. 10A-10K are front elevational views of a device displaying a project according to one or more embodiments of the present disclosure.

FIG. 11C is a front elevational view of the device of FIG. 9A displaying a preview and a second alignment overlay image in an aligned configuration according to one or more embodiments of the present disclosure.

FIG. 11D is a front elevational view of the device of FIG. 9A displaying a preview and a third alignment overlay image in an aligned configuration according to one or more embodiments of the present disclosure.

FIG. 11E is a front elevational view of the device of FIG. 9A displaying a preview and a fourth alignment overlay image in an aligned configuration according to one or more embodiments of the present disclosure.

FIG. 12B is a front elevational view of a device displaying the viewer of FIG. 12A reviewing the project.

FIG. 13 is a flowchart of a method of obtaining images according to one or more embodiments of the present disclosure.

FIGS. 15A-15C are front elevational views of the medical equipment of FIG. 14 utilizing the imaging system and method according to one or more embodiments of the present disclosure.

FIG. 16 is a block diagram of an imaging system for capturing images according to one embodiment of the present disclosure.

DETAILED DESCRIPTION

Embodiments of the present disclosure relate to a camera system and method for aligning images by referencing a previously obtained image to align a subsequent image. The drawings depict some example embodiments as applied to the camera system and method for aligning images for illustrative purposes only, and it will be apparent that modifications may be made without departing from the spirit and scope of the invention, and also that the present disclosure may be used in other applications in the same or similar fields. Although relative terms such as "first," "second," etc. have been used herein to describe relative relationships between elements, it is to be understood that these terms are not intended to be limiting, but are instead used to distinguish one element from another. Moreover, the figures contained in this application are not necessarily drawn to scale. Further, it will be understood that when an element or layer is referred to as being "on" another element or layer, it can be directly on the other element or layer, or one or more intervening elements or layers may be present. As used herein, the terms "use," "using," and "used" may be considered synonymous with the terms "utilize," "utilizing," and "utilized," respectively.

Figure 4B:
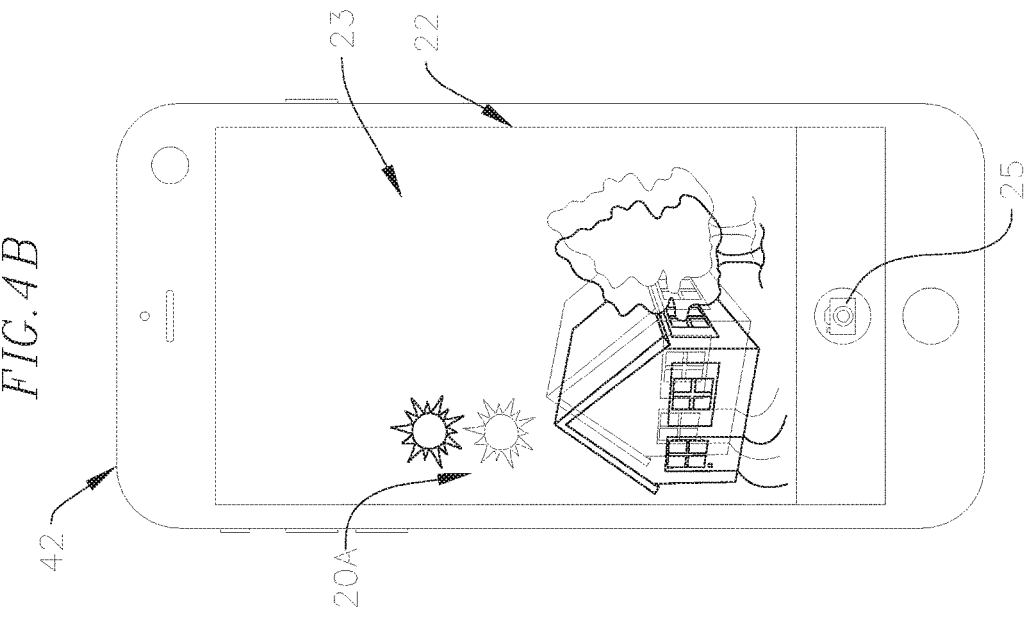
FIG. 4B is a front elevational view of the smartphone of FIG. 4A displaying a preview and a first alignment overlay image prior to being in an aligned configuration according to one or more embodiments of the present disclosure.
Figure 4A:
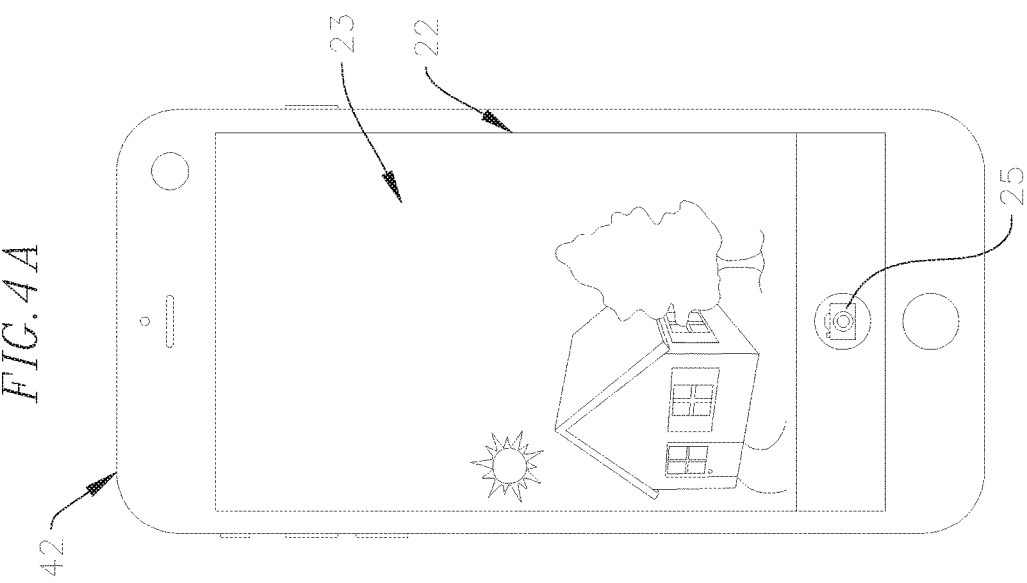
FIG. 4A is a front elevational view of a smartphone that may be used to capture an image and displaying a preview of an image according to one or more embodiments of the present disclosure.

Referring to FIG. 1, FIG. 3, and FIGS. 4A-4F, one or more embodiments of the present disclosure are directed to a camera system and method of aligning images. In one or more embodiments of the camera system of aligning images, a first image 20 is stored in (or on) a memory 24 (e.g., a computer data storage) (S100). In some embodiments, the camera system may be used to obtain the first image 20. The first image 20 may be obtained by any suitable means, for example, by photographing, importing, drawing, loading from remote storage (e.g., over the Internet from a cloud based service), etc. In one or more embodiments, the first image 20 is obtained by controlling a camera 21 (e.g., a digital single lens reflex (DSLR) camera, a built-in camera of a smartphone, etc.) to capture an image. The camera 21 includes an image sensor 21A (e.g., a CMOS sensor or a CCD sensor) that is used to capture the first image 20, a lens that is configured to focus light onto the image sensor, and a display (or viewing screen) 22. The camera 21 can be controlled by a processor 41, which is connected to the camera 21 via a bus 43 (e.g., a peripheral bus). Similarly, the display 22 is coupled to the processor 41 via the bus 43 so that the processor 41 can supply image signals to the display 22. As illustrated in FIG. 4A, the display 22 is configured to provide a preview 23 (e.g., a real-time preview or a live preview) of an image (e.g., a target image) currently being captured by the camera 21. In other words, the display 22 displays the target image prior to capture of an image, similar to a traditional viewfinder. The display 22 is also configured to display a previously captured (or imported) image. It will be appreciated that the display 22 is also configured to display a previously captured (or imported image) and the preview 23 concurrently.

The first image 20 may be captured by the DSLR camera and stored on a memory card or internal memory drive. As another example, the first image 20 may be captured by a built-in camera of the smartphone and stored on an internal non-volatile memory (e.g., integrated flash memory) or dynamic random access memory (RAM or DRAM) or on a removable memory card (e.g., a Secure Digital (SD) card). In one or more embodiments, the memory 24 is RAM, which allows for the first image 20 to be stored and accessed relatively quickly. In some embodiments, the memory 24 may be more than one type of memory, for example, both dynamic RAM and a non-volatile memory. In one or more embodiments, the first image 20 is cached for more efficient retrieval of the first image 20 at a later point time.

Prior to capturing a second image 26, the first image 20 is recalled and overlaid (or projected or made visible) at a reduced opacity on the preview 23 on the display 22, thereby generating a first alignment overlay image (or first overlay image) 20A (S110). The opacity may be selected such that the preview 23 is not fully obstructed (e.g., remains distinguishable from the first alignment overlay image 20A) when the first alignment overlay image 20A and the preview 23 are concurrently displayed on the display 22, yet the first alignment overlay image 20A is still visible on the display 22. For example, the first alignment overlay image 20A may have an opacity of about 40%. The display 22, much like a traditional viewfinder, provides the preview 23 of the second image 26 prior to capturing the second image 26. Because the first alignment overlay image 20A is overlaid on the preview 23 to generate a combined preview such that both the first alignment overlay image 20A and the preview 23 are presented on the display 22, the first alignment overlay image 20A may be used to align a reference (e.g., an object or objects, a common object or objects, a common profile, etc.). In some embodiments, the first alignment overlay image 20A is overlaid on the entire portion or substantially the entire portion of the preview 23. In addition, in some embodiments, the first alignment overlay image 20A is cropped, and/or scaled to overlap with the preview 23. For example, the preview 23 may show less than the entire field of view captured by the camera 21, in which case the overlay image 20A may be cropped to correspond to the field of view shown in the preview 23. As another example, the preview 23 is generally displayed at a lower resolution (e.g., the resolution of the display 22) than the resolution of images captured by the camera 21 (e.g., the resolution of the image sensor 21A of the camera). As such, in some embodiments, the processor 41 scales the overlay image 20A to the resolution of the preview 23. In some embodiments, the reference may be common to the first alignment overlay image 20A and the second image 26. As such, the camera 21 may be positioned according to the reference to capture the second image 26 such that the reference is similarly oriented between the first image 20 and the second image 26. For example, the camera 21 may be positioned in substantially the same location to capture the second image 26 relative to the location where the first image 20 was captured, without the need for a tripod or other external aligning equipment. It will be appreciated that the reference may be any suitable object to achieve the desired alignment. For example, a constant background or frame may be referenced, with a changing focal point, and any stationary object in the two images may be used as the reference for alignment. As another example, a constant focal point may be used, and a non-stationary object may be used as the reference, with a particular feature of the non-stationary object as the reference (e.g., a person's nose). As yet another example, the reference may be a common profile or silhouette, such as an outline of a person. Accordingly, both the background and the object may change between the first image 20 and the second image 26, but the common profile or silhouette may be used as the reference. In some embodiments, the first alignment overlay image 20A may be used as a guide regardless of any commonality between objects, profiles, backgrounds, etc. between the first image 20 and the second image 26. Further, because the first alignment overlay image 20A is at a reduced opacity (e.g., a 40% opacity), a user may reference the objects in the first alignment overlay image 20A while still being able to view the preview 23. It will be appreciated that the first alignment overlay image 20A may optionally be used to "match" common objects between the first image 20 and the second image 26, and/or the first alignment overlay image 20A may be used as a guide for alignment, with or without regard to matching or including common features.

Although reference is made to the first alignment overlay image 20A having a reduced opacity, in some embodiments, the first alignment overlay image 20A may be modified to a grey scale, black and white, and/or a color (e.g., orange), to allow a user to reference both the first alignment overlay image 20A and the preview 23 of the second image 26. In some embodiments, one or more objects in the first alignment overlay image 20A may be modified to an outline, a shaded area, and/or a blacked out area, where remaining portions of the overlay image (e.g., portions that are not part of the outline, shaded area, and/or blacked out area) may be fully transparent (e.g., 0% opacity) or may be partially transparent (e.g., 50% opacity). In some embodiments, the outline may be generated by applying an edge detection filter to the originally captured image or a modified image. As such, when the first alignment overlay image 20A is overlaid on a subsequent preview 23, the preview 23 and at least a portion of the first alignment overlay image 20A remain visible. These features may be used alone or in combination.

In some embodiments, the user interface provides a control for selecting how the overlay is displayed, e.g., as an image having reduced opacity, as an outline, as a black and white image, etc. In some embodiments, the user interface provides controls for modifying the appearance of the overlay, e.g., the opacity percentage of the overlay, the thresholds for the edge detection filter, and transformations (e.g., scaling, translating, and/or distorting) of the overlay image. For convenience of explanation, reference is made herein to alignment overlay images having reduced opacity, although embodiments of the present disclosure are not limited thereto.

In some embodiments, the first alignment overlay image 20A may be generated and stored in the memory 24 along with the first image 20.

Referring to FIGS. 4B-4C, the first alignment overlay image 20A may be used to align the camera 21 prior to capturing the second image 26. For example, one or more common objects (or similar objects) in the first alignment overlay image 20A and the preview 23 may be referenced to align or substantially align the common objects in the first image 20 and the second image 26. As illustrated in FIG. 4B, when the camera 21 is not in an aligned configuration, a duplicate of some of the common objects may be shown on the display 22 because the preview 23 and the first alignment overlay image 20A are not in alignment. However, as illustrated in FIG. 4C, when the camera 21 is in the aligned configuration, the common objects align (or stack on each other) such that the duplicate that is present during a process of aligning is no longer visible (or substantially no longer visible). Once the camera 21 is aligned, the second image 26 is captured, for example, by engaging the shutter button 25 (S120). The second image 26 is then stored in the memory 24 (S130). It will be appreciated that although in some embodiments, alignment of the camera 21 refers to precise alignment and overlapping of subsequent images, the present disclosure is not limited thereto or thereby.

The above-described process may be repeated to capture any number of images. For example, prior to capturing a third image 28, a second alignment overlay image 26A corresponding to the second image 26 but having a reduced opacity may be overlaid on the preview 23 of the third image 28 on the display 22. Once the camera 21 is aligned by referencing the second alignment overlay image 26A and the preview 23, the third image 28 is captured and stored in the memory 24.

The above-described method may be used to create a project 30, which includes a plurality of images. For example, in some embodiments, the project 30 includes the first image 20, the second image 26, the third image 28, a fourth image 32, and a fifth image 34. Although reference is made herein to the project 30 including five images, the present disclosure is not limited thereto, and the project 30 may include more than five images or fewer than five images, but preferably at least two images. For convenience of explanation, the following description is made with reference to five images in the project 30.

In one or more embodiments, any previously taken alignment overlay image may be overlaid on the preview 23. In other words, the most recently captured alignment overlay image does not need to be used as the alignment overlay image for capture of the immediately succeeding image. For example, prior to capturing the fourth image 32, the first alignment overlay image 20A may be overlaid on the preview 23 on the display 22. As such, the camera 22 may be aligned by referencing the first alignment overlay image 20A, even though the third image 28 was more recently captured. As such, various branches may be created from the same alignment overlay image. In other words, any alignment overlay image may serve as a baseline for a subsequent image, and the alignment overlay image may be varied over time. In some embodiments, although a non-sequential alignment overlay image is used for the capture of a later image, the later image may be added to the project in sequential order, as opposed to creating various branches. In other words, as an example, the first image 20, the second image 26 (by referencing the first alignment overlay image 20A), and the third image 28 (by referencing the first alignment overlay image 20A), and the fourth image 32 (by referencing the third alignment overlay image 28A) may be captured. Although various alignment overlay images are used, the project 30 may be assembled with the first image 20, the second image 26, the third image 28, and the fourth image 32 in sequential order. In some embodiments, the previously taken alignment overlay images are limited to the previously taken images in the same project 30.

Figure 1:
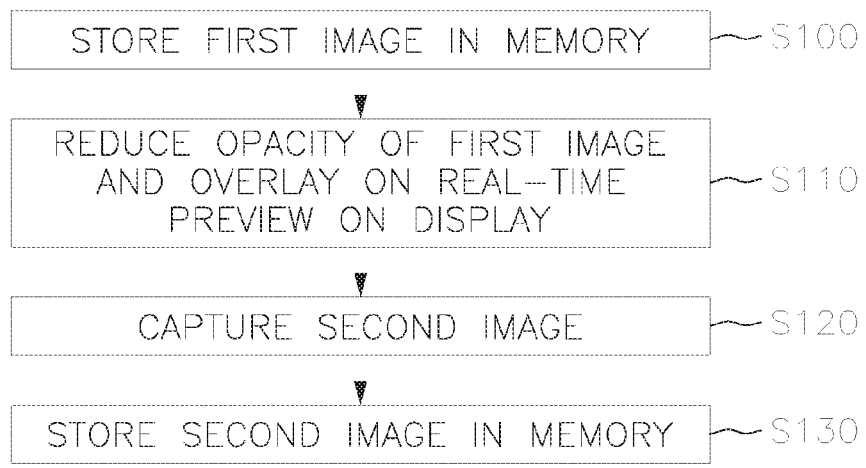
FIG. 1 is a flowchart of a method of obtaining images according to one or more embodiments of the present disclosure.
Figure 2:
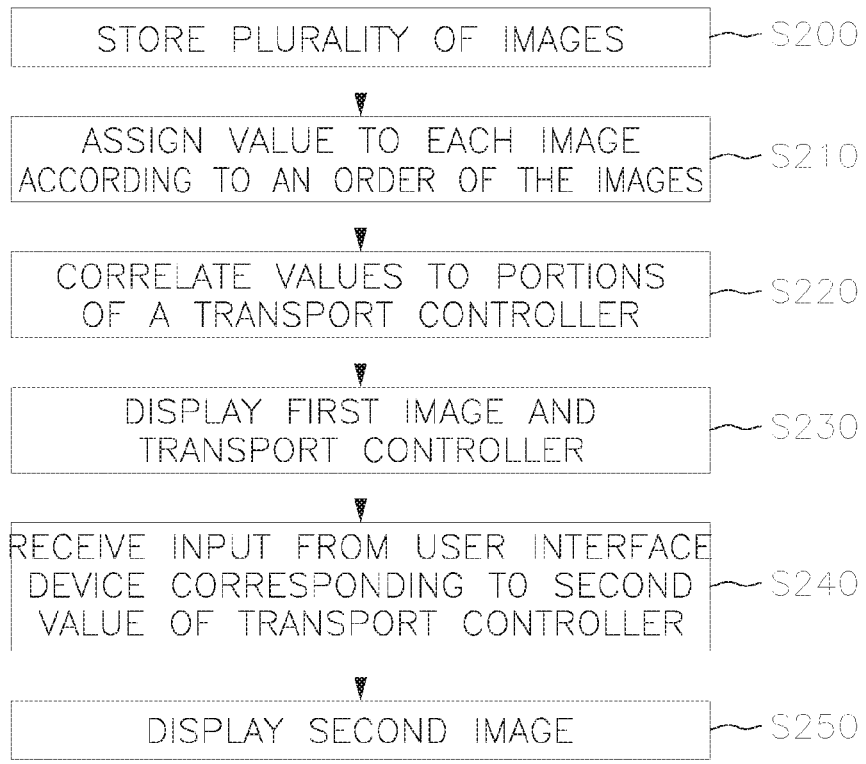
FIG. 2 is a flowchart of a method of presenting a series of aligned images according to one or more embodiments of the present disclosure.

Referring to FIG. 2 and FIGS. 5A-5B, in one or more embodiments, the first through fifth images 20, 26, 28, 32, and 34 are obtained according to the method of obtaining images and are stored on the memory 24 (S200). The first through fifth images 20, 26, 28, 32, and 34 are then assembled (e.g., consecutively or successively assembled) to form the project 30. Thus, the project 30 is a compilation of the first through fifth images 20, 26, 28, 32, and 34. In some embodiments, the first through fifth images 20, 26, 28, 32 and 34 may be compiled in consecutive order to create the project 30. However, the present disclosure is not limited thereto. As discussed further below, in some embodiments, the project 30 may include the first through fifth images 20, 26, 28, 32, and 34 in any order. For convenience of explanation, the following description is made with reference to the first through fifth images 20, 26, 28, 32, and 34 in consecutive order in the project 30. The project 30 may be displayed, for example, on the display 22 or on an external screen. In some embodiments, the project 30 may be displayed on an external computer monitor and may be accessed via an internet connection to a server.

In one or more embodiments, the project 30 is then advanced or scrubbed, presenting the first image 20, then the second image 26, then the third image 28, then the fourth image 32, then the fifth image 34. For example, the project 30 may be advanced in a manner similar to a time-lapse. When advancing through the project, in some embodiments, the images may be displayed at high resolution (or full resolution), rather than merely as low quality preview images (where the previous images may exhibit significant noticeable artifacts) or as thumbnail images (where the thumbnail images may have significantly reduced resolution and/or only be displayed on a small portion of the display). For example, when advancing an image, the images may be displayed on substantially the entire display 22 (e.g., on all portions of the display 22 except for user interface controls and status bars), in a substantial portion of the active window (e.g., a web browser window) of the display 22 (e.g., the image may take up more than half of the height or width or may be the largest item in the window), or the images may be displayed at their native resolutions (e.g., with a one to one correspondence between the pixels in the image and the pixels of the display 22). A user may scrub the project 30 at any desired speed. The user may also scrub the project 30 forward or backward or may start viewing the project 30 at any image, for example, at the third image 28.

Existing techniques for navigating or browsing through collections of pictures, one at a time, typically involve actuating a "next" control (or a "previous" control) which loads and displays the next (or previous) image in the collection when the control is activated. Such controls may be implemented by, for example, clickable user interface elements or the arrow keys of a keyboard. However, when using such systems, the speed at which the various images are displayed is controlled by the speed at which the user actuates the control. In other words, the user changes the view from one image to another by supplying a substantially discrete input. The speed at which the images change may be limited by the speed at which the user can activate the control (e.g., how quickly the user can click the mouse, tap a touchscreen, or press an arrow key on a keyboard). These characteristics of existing techniques for browsing collections of pictures can lead a user to feel that the images are disconnected from one another.

To enable a user to advance through the project 30 utilizing a transport controller (or a transport controller interface) according to one or more embodiments of the present disclosure, each of the images is assigned a value (or percentage) according to an order of the images in the project 30 (S210). For example, if the project 30 includes five images, the first image 20 may be assigned a first value corresponding to 0-20%, the second image 26 may be assigned a second value corresponding to 21%-40%, the third image 28 may be assigned a third value corresponding to 41%-60%, the fourth image 32 may be assigned a fourth value corresponding to 61%-80%, and the fifth image 34 may be assigned a fifth value corresponding to 81%-100%. The respective values of the images are then correlated to portions of a transport controller 38 (S220). As such, the transport controller 38 may be divided into a number of sections equal to the number of images in the project—in this example, five equal sections, such that a first section corresponds to the first image 20, a second section corresponds to the second image 26, a third section corresponds to the third image 28, a fourth section corresponds to the fourth image 32, and a fifth section corresponds to the fifth image 34. In some embodiments, the transport controller 38 may be a bar 37 and have a linear shape (e.g., a straight line). In some embodiments, the transport controller 38 may be non-linear, for example, the transport controller 38 may have a circular shape (or another closed loop shape such as an ellipse or rounded rectangle) with adjacent segments corresponding to the assigned values of the images such that engagement and movement in a direction (e.g., a clockwise direction) alters the displayed image. In addition, in some embodiments of the present invention in which the transport controller 38 has a closed loop shape, engagement and movement of the transport controller (e.g., the movement of a button 36 corresponding to a location on the transport controller) along the loop merely indicates an amount to progress in displaying the images in the project. For example, a half revolution in the clockwise direction may transition from the first image 20 to the second image 26, and a full revolution in the clockwise direction may progress to the third image 28. Continuing to rotate the transport controller in the clockwise direction to one-and-a-half revolutions may proceed to the fourth image 32, and two complete revolutions may proceed to the fifth image 34.

The camera system may initially display the first image 20 and the transport controller 38 (S230). The camera system may then receive a first user input from a user interface device (e.g., a mouse, a touch screen integrated with the display, a touchscreen external to the display, a track ball, and/or a stylus) to engage the transport controller 38, for example, a button 36 (or an icon, a transport control button, a slider, a scrubber, etc.). When the user engages and then drags or relocates the button 36 (e.g., in a first direction) using a substantially continuous motion, the camera system may seamlessly (or substantially seamlessly) change the view (or the displayed image) from one image to the following image. For example, the user interface device may be a touch screen and the button 36 may be a virtual button or icon on the touch screen that is configured to respond to a user's touch. As another example, the user interface device may be a handheld controller and the button 36 may be a tactile button that, when actuated, results in a change of the displayed image (for example, via physical actuation or via signal).

The alignment (or position) of the button 36 in the first direction corresponds to the order of the first through fifth images 20, 26, 28, 32, and 34. When a user input corresponds to the first value (e.g., the button is to the far left of the bar 38), the first image is displayed. The button 36 is movable (e.g., slidable) along the bar 37. When the user slides the button 36 along the bar 37 from the first section to the second section, the displayed image may change from the first image 20 to the second image 26. In other words, the system receives an input from the user interface device (e.g., the touch screen) corresponding to the second value (e.g., by dragging the button 36) (S240) and then displays the second image when the button 36 is in a position corresponding to the second value (S250). This allows the user to easily control the display of the various images within the project, and the speed at which the images are changed from one image to the next, by moving or dragging the button 36 along the bar 37. In some embodiments, the button 36 may be a virtual button (or icon) on a display screen (such as a computer monitor), that is configured to be movable by an external input, such as a mouse click and subsequent dragging. As such, when the project 30 is displayed on an online webpage, for example, the user may use a corresponding mouse to control the button 36.

In some embodiments, when the transport controller 38 has the circular shape, movement of the transport controller 38 in the circular shape may be configured such that one revolution of the transport controller 38 corresponds to the project 30 in its entirety. As such, completion of one revolution displays the project 30, and commencement of a second revolution may reset (e.g., seamlessly reset) the project 30 at the beginning of the project 30. Accordingly, it may be easy for a user to play and replay the project 30 by engaging the transport controller 38.

Thus, by using the method of aligning images according to one or more embodiments of the present disclosure, the user may create a time-lapse (e.g., the project 30) over any period of time (e.g., a prolonged period of time), of any object (e.g., a non-stationary object), without the need for a tripod or other alignment equipment, and with smooth or substantially smooth transitions between images. For example, smooth transitions between images can be implemented by fading out the previous image and fading in the next image. In another embodiment the smooth transitions may be generated using motion interpolation algorithms (see, e.g. Zhai, Jiefu, et al. "A low complexity motion compensated frame interpolation method." 2005 *IEEE International Symposium on Circuits and Systems*. IEEE, 2005.). In addition, the user may move the camera 21 between capturing each image of the project 30 while framing (or aligning) the camera 21 in the same or substantially the same position between images (or camera shots) relative to the focal point of a previous image, the background of a previous image, or any desired object or aspect of the previous image.

Embodiments of the present disclosure provide the user with an increased sense of connectedness between the images by providing visual elements that remain constant as the user scrubs through the images in the project. The constant visual elements may include, for example, the transport controller 38, the position of the button 36 along the transport controller 38/bar 37 in proportion to the progress through the project), and the location of the image within the screen (e.g., the images may change without any shifting due to a "reload" or "refresh" of the user interface). These constant visual elements and the continuity of the transport controller interface thereby solve problems with existing interfaces in which the relationships between images seem disconnected from one another. Further, in some embodiments, when the project 30 is accessed, every image of the project 30 is stored in the memory 24 and made accessible for viewing, thereby preventing or reducing the likelihood of buffering (or loading) issues when scrubbing through the images in the project.

In some embodiments, the button 36 may be advanced without dragging. In other words, the button 36 may "jump" along the bar 37 according to an input, such as the user's touch on the bar 37 or the click of the mouse on the bar 37. For example, when the first image 20 is displayed, the user may touch the bar 37 at the fourth section to display the fourth image 32, thus bypassing the second and third images 26 and 28. In some embodiments, when the user contacts (or engages) the bar 37 at a non-linear section, any images between the previously displayed image and the image corresponding to the designated section may be displayed. For example, when the first image 20 is displayed and the user touches the bar 37 at the fourth section to display the fourth image 32, the second and third images 26 and 28 may be displayed (e.g., rapidly displayed) before the fourth image 32 is displayed. The user may then contact a different portion of the bar 37 or drag the button 36 to display a different image. In some embodiments, when the user contacts a portion of the bar 37, the button 36 may move to the contacted portion of the bar 37 so that a location of the button 36 on the bar 37 corresponds to the section of the bar 37 associated with the displayed image.

In some embodiments, when the user touches (or taps or clicks and releases without dragging) the button 36, the project 30 (e.g., the images in the project 30) may be advanced. For example, the images of the project 30 may be advanced as though a user were scrubbing through the project 30. As such, tapping the button 36 may initiate "autoplay" of the project 30.

Figure 6B:
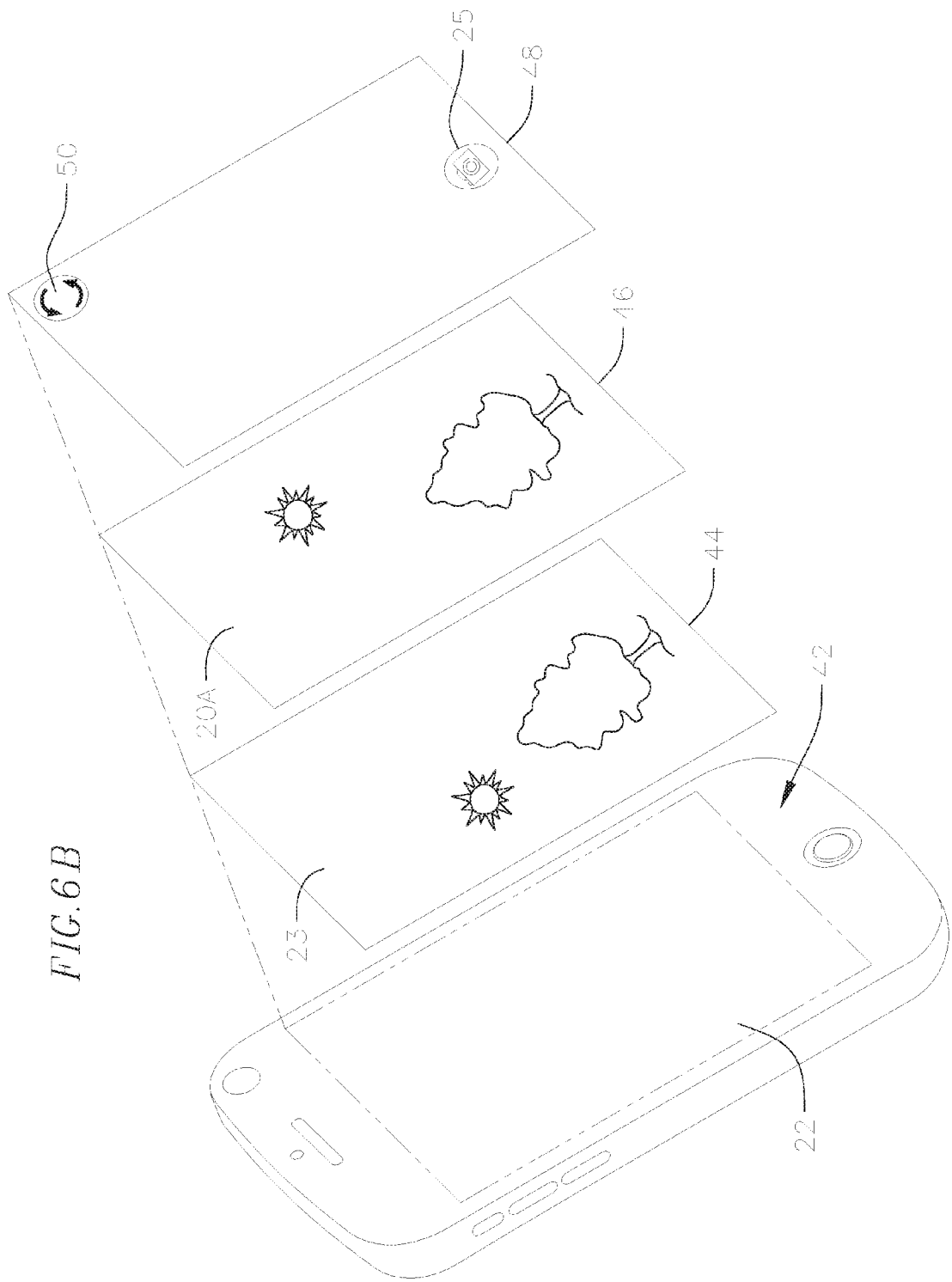
FIG. 6B is an exploded perspective view of the program of FIG. 6A with a first alignment overlay image in the alignment layer according to one or more embodiments of the present disclosure.

Referring to FIGS. 6A-6B, the present disclosure is also directed to a camera system utilizing the method of aligning images according to one or more embodiments of the present disclosure. For example, the camera system may be used in any apparatus (or a combination of apparatuses) having a memory storage device (e.g., the memory 24), the camera 21 (e.g., a camera application, a DSLR camera, etc.) for capturing an image (e.g., the sensor 21A), and a screen that provides a preview of the image (e.g., the display 22 that provides the preview 23). As such, as non-limiting examples, the method of aligning images may be used in a DSLR camera, a smartphone, a smartphone software application, glasses, a watch, a computer, or a drone. The memory storage device, camera, and display may each be formed in a single apparatus (e.g., a smartphone with preloaded software), or various components may be combined or externally connected (e.g., the display may be connected to the camera via a cable).

In one or more embodiments, a program 40 is installed on a smartphone 42, which includes the camera 21. The program 40 may include a generation mode, a publication mode, and a feed (or display) mode. The generation mode is used to create the project 30. The publication mode is used to publish the project 30 and the feed mode displays projects published by the user and by other users, as described further below. When the program 40 is opened (or accessed), the program 40 may initialize in the feed mode and may include an icon which, when engaged, adjusts the program 40 from the feed mode to the generation mode and vice versa. As such, when the program 40 is in the feed mode and a user engages the icon (e.g., touches a portion of a screen of the smartphone 24 where the icon is displayed), the program 40 may temporarily deactivate from the feed mode and activate the generation mode. Similarly, the program 40 may include an icon which, when engaged, adjusts the program 40 from the generation mode to the publication mode and vice versa.

When the generation mode is activated, the program 40 communicates with the camera 21 (e.g., activates the camera 21). When a user has not established permission for the program 40 to communicate with the camera 21, the program 40 may prompt the user to enable communication between the camera 21 and the program 40.

For each project 30 created with the program 40, a user may designate the orientation of the camera 21 for the project 30 (e.g., a portrait orientation mode or a landscape orientation mode). In some embodiments, the program 40 writes the orientation mode selection into the memory 24 of the smartphone 42 and applies the orientation mode selection to the project 30 so that the camera 21 consistently orients in portrait or landscape mode throughout creation of the project 30. In some embodiments, the program 40 may provide the user with a preview of each orientation mode. In some embodiments, the program 40 may omit the orientation mode selection.

The program 40 enables the user to capture the first image 20. For capture of the first image 20, the program 40 activates the display 22, which includes a plurality of layers. For example, a first layer from the plurality of layers may correspond to a camera view layer 44, or a user interface ("UI") view layer. A second layer from the plurality of layers may correspond to an alignment layer (or overlay layer) 46, and a third layer from the plurality of layers may correspond to a controller layer 48. As discussed further below, in some embodiments, the program 40 includes the camera view layer 44 and the alignment layer 46 and omits the controller layer 48. The camera view layer 44 includes a camera view, which is typically shown on the display 22 when the user activates the camera 21. In other words, the camera view layer 44 provides the preview 23 of an image to be captured before the image is captured. As such, as a user moves the smartphone 42, the image displayed on the camera view layer 44 will change.

The alignment layer 46 is layered on top of the camera view layer 44. When the project 30 does not yet include any images (e.g., when the user is capturing the first image 20), the alignment layer 46 is a transparent layer. As such, an initial alignment layer 46A (e.g, the alignment layer 46 that is displayed before the first image 20 is captured) serves as a dummy layer. In some embodiments, the alignment layer 46 extends to each edge of the display 22 such that the alignment layer 46 covers each edge of the display 22 when the plurality of layers are stacked on each other.

The controller layer 48 is layered on top of the alignment layer 46. The controller layer 48 includes various controls and/or buttons that enable the user to capture the image when the user has framed the image as desired, and is generally transparent (e.g., is transparent except for the various controls and/or buttons on the controller layer 48). For example, the controller layer 48 may include the shutter button 25 a camera swap button 50, and a back button. It will be understood by one of ordinary skill in the art that although the shutter button 25, camera swap button 50, and back button are described as buttons, that these features are digitally displayed by the controller layer 48 on the display 22 and are not actual physical implementations of buttons. Instead, a user may touch the display 22 in an area corresponding to the shutter button 25 to send a signal to the processor 41 of the smartphone 42 to capture the image displayed on the camera view layer 44. Similarly, the user may touch the display 22 in an area corresponding to the camera swap button 50 to send a signal to the processor of the smartphone 42 to switch from a front-facing camera to a rear-facing camera if the smartphone 42 includes more than one camera 21. When the user engages the back button, the program 40 may shift from the generation mode to the feed mode.

In some embodiments, the shutter button 25 may correspond to the controller layer 48 in its entirety, such that if the user touches (or presses and holds on) any portion of the display 22 while it is displaying the controller layer 48, an image is captured. It will be appreciated by one of ordinary skill in the art that in some embodiments, the controller layer 48 may be omitted. For example, in some embodiments, the camera 21 may be actuated by a physical implementation of a shutter button 25. For example, on a DSLR camera, the shutter button 25 may be a mechanically actuated button on a camera body of the DSLR camera, or on the smartphone 42, for example, a volume button or other mechanically actuated button may function as the shutter button 25. As such, in some embodiments, the controller layer 48 may be unnecessary or redundant. However, in some embodiments, the program 40 may include the controller layer 48 even if mechanical or other means for actuating the shutter button 25, the back button, and/or the camera swap button 50 are present. However, for convenience of explanation, the following description is made with reference to embodiments including the controller layer 48.

It will be appreciated by one of ordinary skill in the art that any user interface buttons that are physically represented on the display 22 and actuated by touch may be implemented as tactile buttons that are mechanically actuated and/or manipulated.

When the user uses the program 40 to capture the first image 20, the program 40 displays the camera view layer 44, the alignment layer 46 (i.e., the initial alignment layer 46A), and the controller layer 48 on the display 22. The user may then align the camera 21 by referencing the display of the camera view layer 44 and may capture the first image 20 by engaging the shutter button 25 on the controller layer 48.

To capture the first image 20, the user engages the shutter button 25. The program 40 then sends a signal to the camera 21 to capture an image, and the camera 21 writes (or records) the first image 20 in a temporary storage file. After the first image 24 is captured, the program 40 may display the first image 24 to the user for review. The user may then engage one of a plurality buttons to indicate whether the first image 20 should be saved or discarded.

When the first image 20 is tagged to be saved, the program 40 stores the first image 20 in the memory 24. The memory 24 may be, for example, an internal memory on the smartphone 42, an external memory such as a microSD card or other external memory card, or may be a cloud storage. The first image 20 is stored in the memory 24 for use in the project 30.

In some embodiments, when a new project 30 is created, the program 40 creates a folder in a general "photos" application or similar application on the device. As additional images are added to the project 30, they are stored to the folder. When each image is added to the project 30, although the images are locally stored on the device, each image is associated with a unique object id that is then provided to a backend server. A dictionary is then created according to the object ids in the backend server and the object ids are mapped to the locally stored images API identifier for the folder. As such, the program 40 may recognize the folder in the local "photos" or other app and map those images to the project's object id when a user switches devices. In some embodiments, when a user publishes the project 30 using the publish mode, all photos in the folder are collected, compressed (e.g., to 80% of their original size) and placed in an array and saved on the backend server.

At a later point in time (e.g., immediately after capturing the first image 20, minutes after capturing the first image 20, hours after capturing the first image 20, days after capturing the first image 20, etc.), the second image 26 is captured for the project 30. When the user activates the program 40, the program 40 accesses the stored orientation mode of the camera 21, and orients the camera 21 accordingly. It will be appreciated that in embodiments omitting the orientation mode selection, the the camera 21 may be manually oriented for consistency between images. The program 40 then accesses the first image 20 and recalls and modifies the first image 20 to generate the first alignment overlay image 20A. The initial alignment layer 46A is then replaced by the first alignment overlay image 20A in the alignment layer 46. The first alignment overlay image 20A is displayed as the alignment layer 46 at a reduced opacity. For example, the first alignment overlay image 20A may be displayed at an opacity of 50%. The first alignment overlay image 20A may be stored in the memory 24 at a reduced opacity, or the opacity of the first alignment overlay image 20A may be reduced when the first alignment overlay image 20A is accessed for use in the alignment layer 46.

It will be appreciated that the aspect ratio and/or resolution of the camera 21, the first image 20, and the display 22 may not be identical. Accordingly, the dimensions of the first alignment overlay image 20A may be modified (e.g., cropped) or proportionally adjusted (e.g., scaled) so that the first alignment overlay image 20A has dimensions that match the display 22. In some embodiments, the first alignment overlay image 20A may be stored in the memory 24 and may be a screenshot of the camera view layer 44 that is captured simultaneously with the first image 20. As such, the first alignment overlay image 20A has dimensions that are the same or substantially the same as those of the camera view layer 44. The first alignment overlay image 20A is stored in the memory 24, for example, in the RAM of the smartphone 42. In some embodiments, the first alignment overlay image 20A is cached to provide relatively easy retrieval.

For capture of the second image 26, the display 22 displays the camera view layer 44 (which provides the preview 23 of the second image 26), the alignment layer 46 (which provides the first alignment overlay image 20A at the reduced opacity on top of the camera view layer 44), and the controller layer 48 on top of the alignment layer 46. As such, the first alignment overlay image 20A may be referenced while aligning and framing the camera 21 to capture the second image 26. For example, an object in the first alignment overlay image 20A may be used as a reference for aligning the camera 21 for the second image 26. Because the first alignment overlay image 20A displayed as the alignment layer 46 is a screenshot of the camera view layer 44 of the first image 20, the first alignment overlay image 20A and the camera view layer 44 have the same or substantially the same dimensions, while the first image 20 and the camera view layer 44 may have different dimensions (e.g., the first image 20 may be scaled to a 2:3 ratio, while the camera view layer may be scaled according to the size and dimensions of the display 22). As such, the program 40 may overlay the camera view layer 44 and the alignment layer 46 while reducing the need for additional scaling or modifications to the dimensions of the first alignment overlay image 20A. Thus, the first image 20 and the second image 26 may be aligned with enhanced precision because the likelihood of scaling errors is reduced or minimized. Once the camera 21 is aligned, the the second image 26 may be captured, for example, by engaging the shutter button 25.

Like the first image 20, the program 40 then creates the second image 26, which is stored in the memory 24 for use in the project 30. It will be appreciated by one of ordinary skill in the art that the first image 20, the second image 26, etc. may be used in the project 30 or may be extracted from the memory 24. In other words, the images captured by the program 40 are not limited to use in the project 30 and may be shared with other users, e.g., over the Internet using a cloud based storage and sharing system. Further, images may be added to the project 30 by importing into the program 40 from an external source. Such imported images may be used to create alignment overlay images and/or added to the project 30 without utilizing any alignment overlay image.

To capture the third image 28 for the project 30, the program 40 accesses the second image 26 and generates the second alignment overlay image 26A. The second alignment overlay image 26A is then displayed on the display 22 as the alignment layer 46. As discussed above, the alignment layer 46 is on top of the camera view layer 44, which shows the preview 23 of the third image 28, and is below the controller layer 48. The opacity of the second alignment overlay image 26A is reduced to about 50% prior to its use in the alignment layer 46.

It will be appreciated that this method may be utilized a plurality of times to generate a plurality of images that may be used to create the project 30. Once a plurality of images, for example, five images 20, 26, 28, 32, and 34 are captured, the program 40 may be used to compile the images into the project 30.

In some embodiments, the plurality of images in the project 30 may be arranged consecutively. In other embodiments, the plurality of images may be arranged or rearranged in any order. As discussed further below, in some embodiments the project 30 may be shared. It will be appreciated that when the project 30 is shared with other users, the other users may arrange or rearrange the plurality of images in the project 30, share, create, and/or post a new project utilizing the same images, etc.

In some embodiments, the program 40 may further be configured for internet connectivity for sharing and publishing the project 30. For example, the program 40 may include the publication mode for publishing the project 30 and the feed mode for viewing projects published by the user and by other users. The feed mode may include a feed (or feed page) 54, a profile (or profile page) 80, and/or a search (or search page) 90. The feed 54 may include projects from the user and from other users having feeds to which the user subscribes, or a curated feed of featured projects 30 that are publicly shared or published. Referring to FIG. 7, the feed 54 is displayed on the display 22, or may be displayed on an external screen. For each project 30 displayed in the feed 54, a username 56, a time of publication 58, a caption (or description or title) 60, a transport controller (or scrubber)

62, and the project 30 are displayed, along with other features, including a commenting feature, a sharing feature, and a "like" feature. The user may then advance through the project 30 by engaging an icon or a button on the transport controller 62 to view the project 30. When the feed 54 includes more than one project 30, the projects 30 are stacked (e.g., vertically aligned) in chronological order, such that the most recently published project 30 is at the top of the feed 54, and subsequent projects 30 are stacked below each other, with the first published project 30 being at the bottom. In some embodiments, the feed 54 may be horizontally configured, such that the projects 30 are horizontally aligned. In some embodiments, one or more images in the project 30 may include a separate comment that is displayed with the corresponding images as the user scrubs through the project 30.

Figure 8:
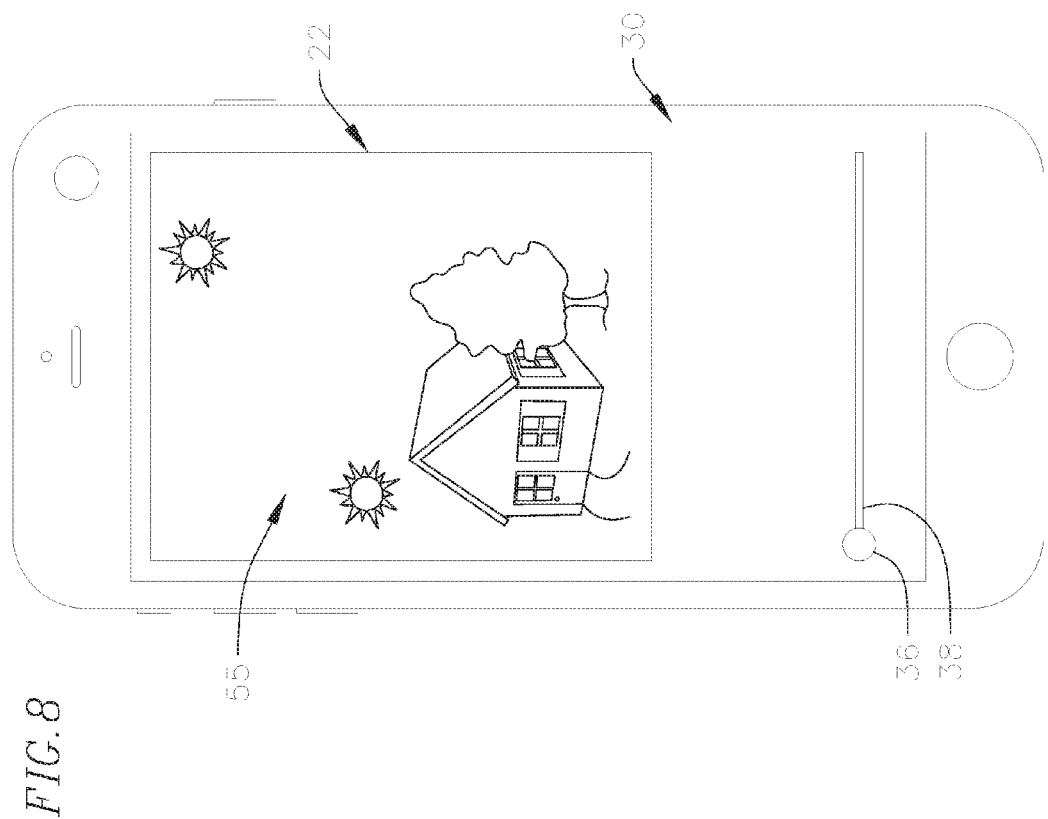
FIG. 8 is a front elevational view of a feed of a program according to one or more embodiments of the present disclosure.

In some embodiments, when the project 30 is initially displayed in the feed 54, a layered composite of one or more images at reduced opacity may be displayed. For example, referring to FIG. 8, the first image 20 and a last image (e.g., the fifth image 34) may be concurrently displayed at a reduced opacity as a feed preview 55 of the project 30 in the feed 54. As such, the project 30 may appear in the feed 54 as one image representing a visual change that occurs throughout the series of images. In some embodiments, the feed preview 55 may include all images in the project 30 at a reduced opacity. As such, when the project 30 is shared via the program 40, the images at full opacity and the alignment overlay images may both be uploaded and stored, and the alignment overlay images may be layered to provide the feed preview 55. However, the present disclosure is not limited thereto, and the images may be uploaded and stored without uploading and storing the alignment overlay images. In such embodiments, the opacity of the images may be reduced by the program 40 after the images are uploaded and saved, and the reduced opacity images may be layered to provide the feed preview 55. The feed preview 55 may include one or more images in the project 30.

In one or more embodiments, the program 40 includes a de-publishing feature, for example, a switch (or toggle switch) 64 associated with the publication mode. After a user has published the project 30, the project 30 will appear in the user's feed and in any subscribers' feeds as a finished project. However, after publishing the project 30, the user may engage the switch 64 (e.g., a touch screen switch on the display 22 of the smartphone 42), removing the project 30 from publication and hiding the project 30 from the user's feed and any subscribers' feeds while the switch is set to depublish. The user may then edit or modify the project 30, without deleting the project 30. Instead, once the user has modified the project 30, the user may engage the switch to publish the project 30, and the project 30 returns to the applicable feeds 54. In some embodiments, the project 30 is re-published with a time of publication 58 corresponding to the re-publication time, and therefore the project 30 will be presented in the feed 54 according to the time of re-publication. In other embodiments, the project 30 is re-published with a time of publication 58 corresponding to the original publication time, such that the project 30 will be presented in the feed 54 according to the time of first publication. In some embodiments, the toggle switch 64 may be published in the subscriber's feed, and may be configured such that the subscriber may publish (i.e., display) or depublish (i.e., hide) the project 30 in the subscriber's feed. When the subscriber sets the project 30 to depublish, the project 30 is hidden, but information about the user who provided the project 30 and/or the project 30 (such as the caption 60 and/or the username 56) may remain visible in the feed, along with the toggle switch 64 so that the subscriber may republish the project 30.

As discussed above, in one or more embodiments, the project 30 is scrubbed (or advanced) according to a speed at which the user drags the button on the transport controller 62. For example, the user may scrub slowly and ensure that one image is displayed for an amount of time, or the user may scrub quickly so that the images move quickly or fluidly. It will be appreciated that in embodiments where the image is scrubbed, the user or a viewer may emphasize some images or objects in each image by engaging the transport controller 62 at variable speeds. In some embodiments, the transport controller 62 may have a fixed length, such that a portion of the transport controller corresponding to each image in the project 30 varies according to a number of images in the project 30. As such, it may be easier for a user to slowly scrub through a project having a small number of images relative to a project having a large number of images.

In some embodiments, the transport controller 62 may be omitted, and the project 30 may be displayed as a video that is played back at a designated speed, for example, at one second per image. However, the present disclosure is not limited thereto, and in some embodiments the images may be played at a faster speed or at a slower speed. Further, the user may designate the speed at which to display the images. For example, the images may be played at the designated speed, which may be selected by the user, and/or the user may select varying speeds so that certain images may be displayed for a first amount of time and other images may be displayed for a second amount of time. In some embodiments, the project 30 is displayed in the feed 54 as a video (e.g., with play or advancement through the images at a predetermined interval) and includes the transport controller 62 for scrubbing through the project 30 after the video has played. In some embodiments where the project 30 is displayed as a video, the transport controller 62 may also be displayed and the icon on the transport controller 62 may automatically advance or move along the transport controller 62 (or the bar 38 of the transport controller 62) as each image is displayed. Further, the user may then utilize the transport controller 62 to view the video by moving the transport controller 62. Similarly, the user may utilize the transport controller 62 to interrupt (or pause) the video while it is being played, or to activate the transport controller 62 and scrub through the project 30 instead of continuing the video.

Figure 9:
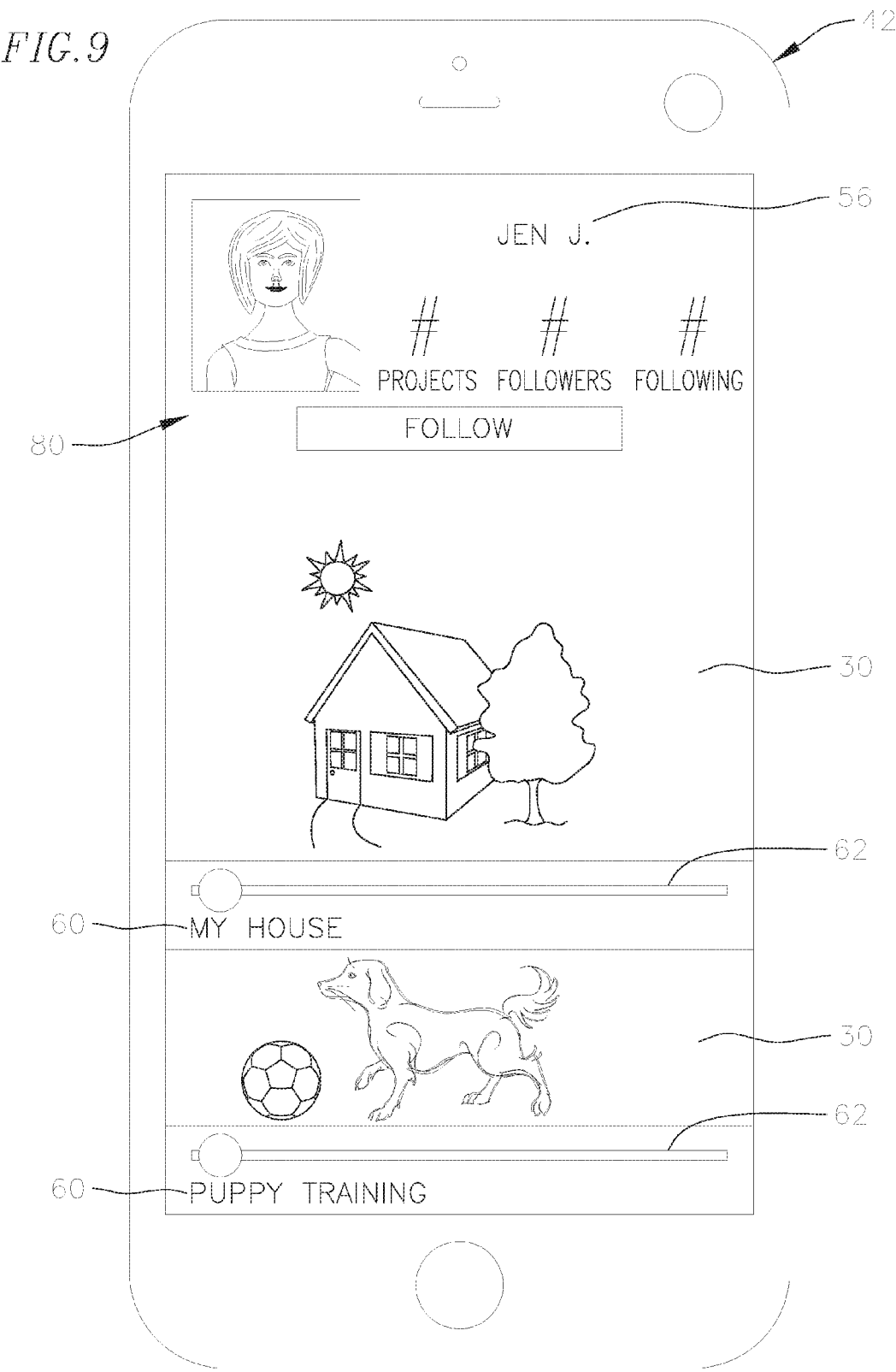
FIG. 9 is a front elevational view of a profile according to one or more embodiments of the present disclosure.
Figures 10A, 10B:
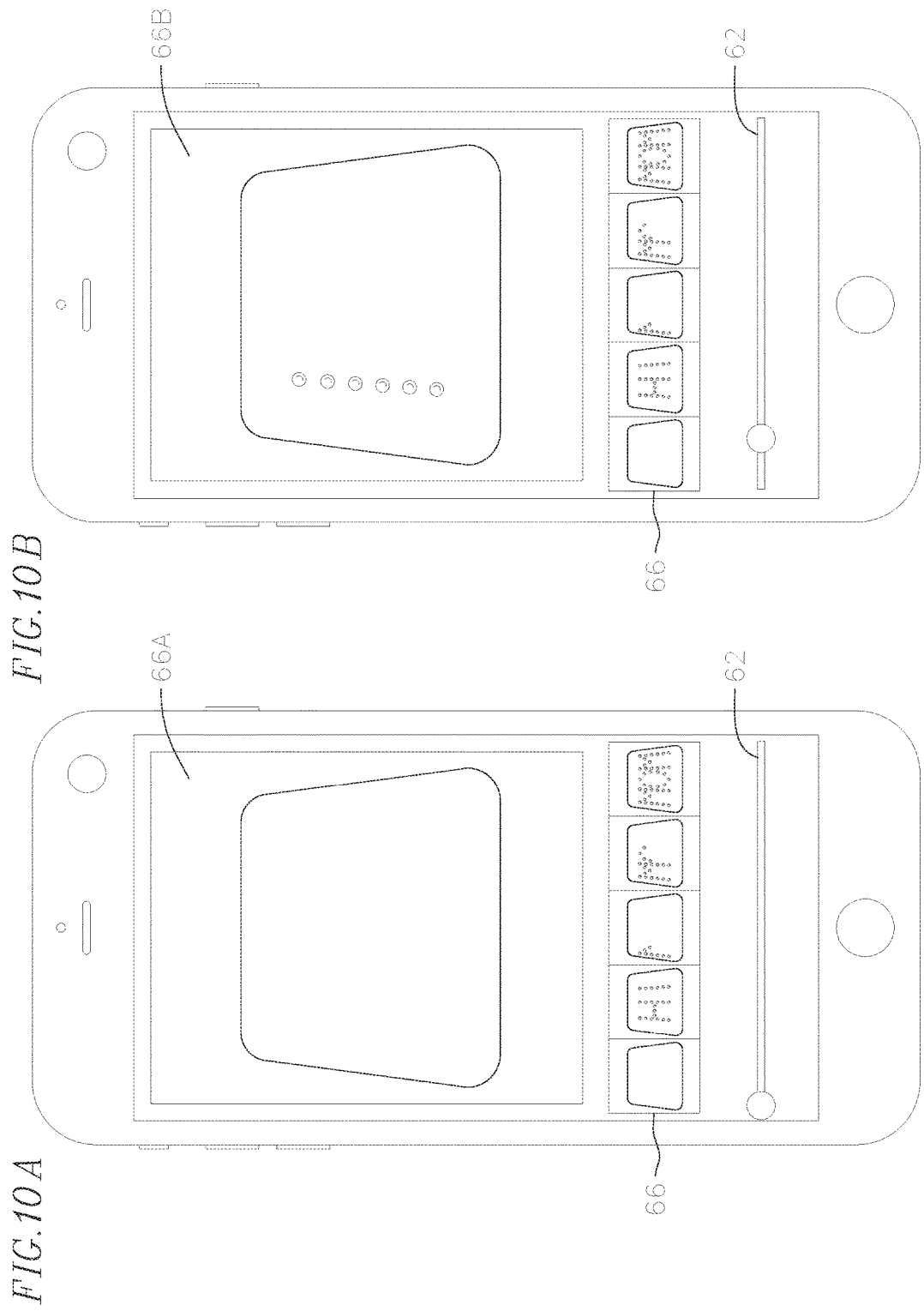
Figure 11A:
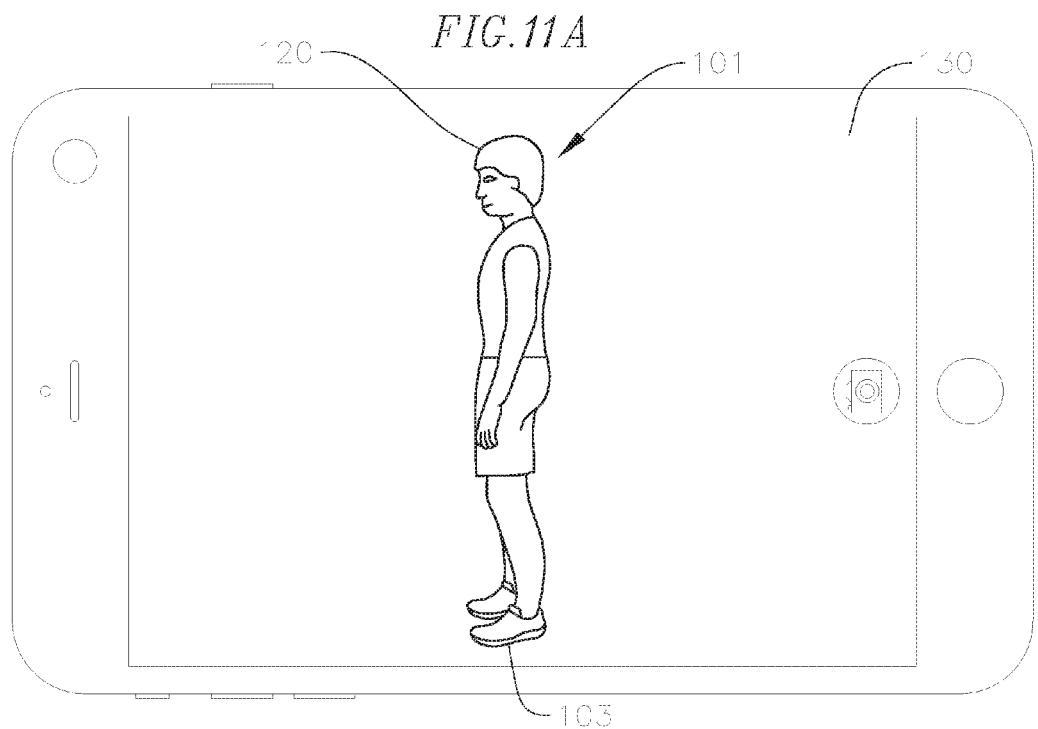
FIG. 11A is a front elevational view of a device that may be used to capture an image and displaying a preview of an image according to one or more embodiments of the present disclosure.
Figure 11B:
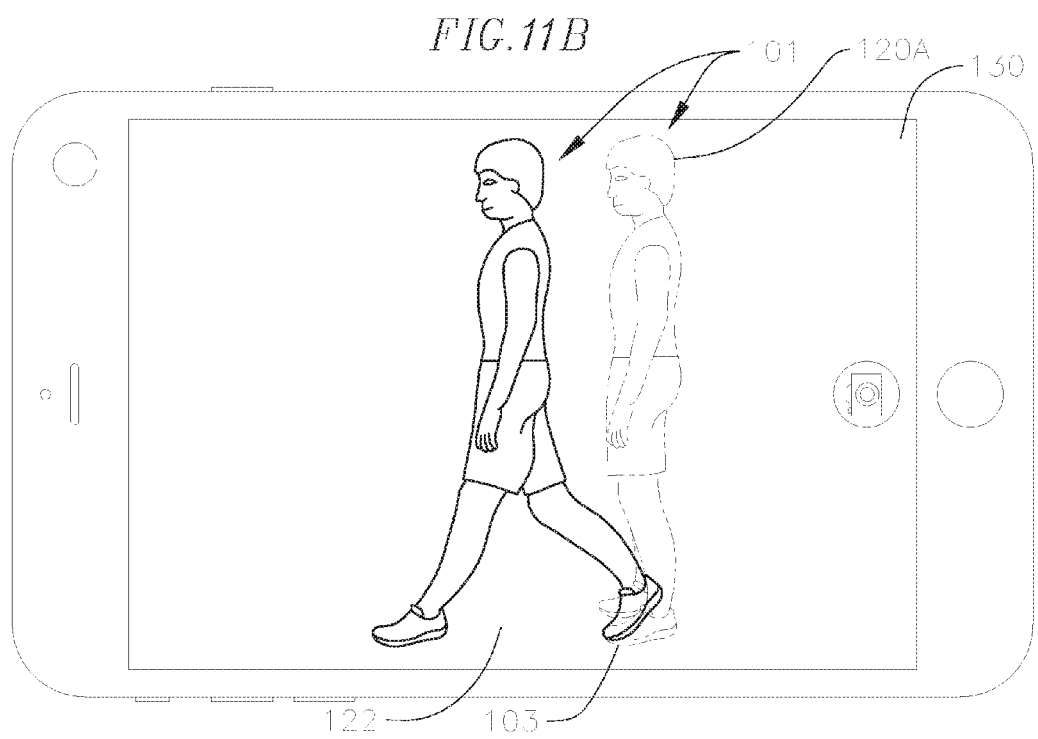
FIG. 11B is a front elevational view of the device of FIG. 9A displaying a preview and a first alignment overlay image in an aligned configuration according to one or more embodiments of the present disclosure.

Referring to FIG. 9, the feed mode of the program 40 may also include the profile (or profile page) 80. The profile 80 may include information relating to the user's account, such as the user's username, number of projects 30 uploaded, number of followers, number of other users the user followers, etc. The profile 80 may also include a feed comprising the projects 30 uploaded by the user. Further, the profile 80 may include any projects 30 that the user has generated, but not yet published. The profile 80 may also include a button that, when engaged, follows or unfollows the user.

The feed mode of the program 40 may also include the search page 90. For example, users may include one or more tags which are associated with a project 30. These tags are then archived and included in a searchable database. For example, a user may tag a project 30 under the tags cooking, Los Angeles, and pie. When any user of the program 40 searches for any of these tags, the project 30 may appear in the feed. In some embodiments, the user may input multiple search terms. The search page 90 may also be used to search by a user's name, topic, theme, category, etc.

In some embodiments, a user may alternate between the feed page 54, the profile page 80, and the search page 90 by contacting a portion of the screen of the smartphone 42 and swiping in a direction, for example, to the right or to the left. In other embodiments, additional icons may be provided that respectively correspond to one of the feed page 54, the profile page 80, and the search page 90 such that when the user engages or contacts one of the icons, the corresponding page is displayed.

In some embodiments, one or more images in the project 30 may be duplicated. For example, the second image 26 may be selected and copied or a screen shot of the second image 26 may be grabbed and inserted between the second image 26 and the third image 28. As such, when the user or the viewer views the project 30, the project 30 may appear to stay on the second image 26 for a prolonged amount of time. As such, the the second image 26 may be emphasized. As an example, as illustrated in FIGS. 10A-10K, the program 40 may be used to create a stop motion project 66 that spells out "HI MOM" in gumballs. A first image 66A of a blank cutting board (see FIG. 10A) may be captured. A second image 66B of a plurality of gumballs in a column (e.g., a vertical or substantially vertical line) on the cutting board may be captured (and an alignment overlay image of the first image 66A may be used to align the camera 21 for the second image 66B, for example, by referencing the cutting board as a common object to align the camera 21 for the second image 66B) (see FIG. 10B). A horizontal line of gumballs and another vertical line of gumballs, forming an "H" (see FIG. 10C) may be added and a third image 66C of the "H" may be captured by using an alignment overlay image of the second image 66B to align the camera 21. Another column of gumballs spaced apart from the "H" to form an "I" may be added to the cutting board (see FIG. 10D). A fourth image 66D of the "HI" may be captured by using an alignment overlay image of the third image 66C to align the camera 21. The cutting board may then be cleared to spell "M"-"O"-"M" on the cutting board, as illustrated in FIGS. 10G-10K, to create the stop motion project 66. The third image 66C may be duplicated so that a viewer is more likely to have time to process the introduction of the "I" formation on the plate (see FIG. 10E). The first image 66A may also be copied and inserted between the third image 66C and a fourth image 66D, to emphasize a space between the words "HI" and "MOM" (see FIG. 10F). Accordingly, the project 66 may include the following images in the following order: the first image 66A, the second image 66B, the third image 66C, the third image 66C, the first image 66A, the fourth image 66D, a fifth image 66E, a sixth image 66F, a seventh image 66G, an eighth image 66H, and a ninth image 66I.

In some embodiments, the program 40 includes a "push notification" feature that allows a subscriber to receive a notification on the smartphone 42 when another user has published a project using the program 40. Accordingly, the subscriber may view published projects in real-time or substantially real-time. In some embodiments, the program 40 may include the push notification for each image captured by the another user. As such, the user can watch the project 30 created by the another user on an image by image basis.

In some embodiments, an image (e.g., the first image 20) captured or saved by a first user may be made available to other users (e.g., a second user and a third user). The first user, the second user, and the third user may then each use the program 40 to create the first alignment overlay image 20A and may individually reference the first alignment overlay image 20A to capture a subsequent image. As such, by using the same first image 20, the first user, the second user, and the third user may each create a distinct subsequent image, although each user referenced the same initial image. Thus, a collaborative group project may be formed by multiple users. It will be appreciated that the images captured by the first, second, and third users may be compiled together to create a single project, or each of the users may create separate projects from the same initial image.

In some embodiments, notifications (e.g., push notifications) may be used for collaborative group projects to provide users information about the collaborative group project and facilitate concurrent contribution to the collaborative group project (for example, in real-time). For example, a first user may provide the first image 20 through the program 40 to other users. A second user may use the first alignment overlay image 20A to capture the second image 26, which is then published via the program 40 and made available in the feed 54 of other users, and a third user may use the second alignment overlay image 26A to capture the third image 28. The first image 20, the second image 26, and the third image 28 may be added to the project 30 and published via the program 40 concurrently, such that the project 30 may be published and created concurrently, regardless of physical location or proximity between the first, second, and third users.

In some embodiments, an image (e.g., the first image 20), may be used to create multiple projects. In other words, the first image 20 may be included in multiple projects by the same user and/or by multiple users. Further, multiple images may be used in multiple projects. For example, the first image 20, the second image 26, and the third image 28 may all be included in a first project and in a second project in any desired order. Additional images may be added to the first project and to the second project, such that the first and second projects are distinct, even though they share common images. As such, various branches of projects 30 may be formed, such that one or more images are shared by multiple projects 30.

In some embodiments, the program 40 interacts with a sensor 68 that senses a level of brightness of surrounding light. For example, the sensor 68 may be a built-in sensor in the smartphone 42 that dims the smartphone 42 according to different brightness levels of the surrounding environment. The program 40 may receive a signal from the sensor 68 that indicates the brightness level of the surrounding environment when the camera 21 is activated by the program 40. The program 40 may then adjust the opacity of a corresponding alignment overlay image according to the brightness of the surrounding environment. For example, if the surrounding environment is relatively light, the opacity of the corresponding alignment overlay image may be increased (e.g., to 60%) and if the surrounding environment is relatively dark, the opacity of the corresponding alignment overlay image may be decreased (e.g., to 20%). As such, the user may still reference the corresponding alignment overlay image, regardless of the brightness of the surrounding environment. As discussed above, in some embodiments, the opacity of the corresponding alignment overlay image may be predetermined or may be manually adjusted by the user.

In some embodiments, the program 40 utilizes global positioning system (GPS) data (e.g., GPS coordinates) to assist the user in arranging and aligning the camera 21 between subsequent image capture. For example, the application may supply a geographical tag to each image that records the GPS coordinates of the camera 21 when an image is captured. When the program 40 is used to capture a subsequent image, the program 40 recalls the GPS coordinates of the previously captured image and may compare the previous GPS coordinates to current GPS coordinates of the camera 21 and then display a message on the display 22 for the user, suggesting a direction (e.g., right or left) in which the user should move to return to the GPS coordinates of the previously captured image. Accordingly, the user may reference the actual location of the previous image, according to the corresponding GPS coordinates, and an alignment overlay image to further increase the likelihood of consistent alignment between subsequent images.

In one or more embodiments, the method of obtaining images may be implemented with a drone and an external screen in wireless communication with the drone. For example, a user may view a preview 23 on a display 22 in communication with a camera 21 on the drone. The drone may utilize GPS coordinates to align the camera 21 thereon in the same or substantially the same location as between images. The user may then reference the preview 23 and an alignment overlay image of a previously captured image captured by the drone to assess any changes over time. The user may also reference the alignment overlay image and the preview 23 and adjust the location of the camera on the drone prior to capturing a subsequent image.

In one embodiment of the present invention, the camera system is mounted on a robotic arm which is used to automatically control the angle and position of the camera system. In these embodiments, the processor 41 is configured to control the robotic arm in order to control the angle and position of the camera 21 such that a first image stored in the memory 24 is aligned with an image being captured by the camera 21. Computer vision techniques can be applied to automatically detect salient features of the first image and the image being captured by the camera to provide this control. In some embodiments using this closed loop control of the robotic arm, the camera system does not include a display 22 on which the real-time preview is shown.

As another example, in some embodiments, the program 40 may monitor the GPS coordinates of the camera 21 and alert the user when the user is proximal to a location of a previously captured image from one of the user's projects 30. For example, if the user is in Santa Monica, Calif. and captured an image using the program 40 in Venice, Calif., the program 40 may alert or notify the user that the user is near the previous location so that the user may capture another image for the project. As another example, the program 40 may include a map feature or may interact with a map feature on the smartphone 42 to track locations where images for the project 30 were captured. For example, the program 40 may record the GPS coordinates of an image and may create a pin on the map corresponding to the GPS coordinates where the user captured an image for a project 30 or where another user captured an image for a project 30. The user may then reference the map to learn the locations of various projects. As such, the user may return to the location and capture additional images. Similarly, the location or GPS coordinates may be shared, and may be used collaboratively among users. For example, an image taken at a particular location may be shared, and other users may access the image (e.g., an alignment overlay image) and use the alignment overlay image to capture a similar image at the same location.

In some embodiments, the program 40 may use facial recognition (or object recognition or edge detection) to align or help align subsequent images. In some embodiments, the overlay image merely provides indications of the location (or locations) of a face (or faces) in the first alignment overlay image 20A. For example, a face detection algorithm (such as the Viola-Jones object detection algorithm) may be used to process the first alignment overlay image 20A to identify the locations of faces within the image. The algorithm may also detect the locations of eyes and other facial features within the image. An overlay may then be generated based on the first alignment overlay image 20A and composited with the preview 23, where the overlay indicates the location (or locations) of the face (or faces) by displaying abstract line drawing representations of faces (e.g., using oval shapes) and facial features (such as eyes). The Viola-Jones object detection algorithm may also be used to detect other (e.g., non-face) objects in images.

In addition, the object recognition or facial recognition of objects allows the system to attempt to automatically align the current preview image with an alignment overlay image. For example, after detecting objects (e.g., faces) in the alignment overlay image, the system may attempt to automatically detect the same objects in the current preview image and, when it detects such matching objects, provide an indication (e.g., a visual or audible indication) that the matching objects are aligned. In some embodiments of the present disclosure, the system may automatically crop portions of the image so that the matching objects are in the same portion of the final images (e.g., in a manner substantially similar to those used for digital image stabilization or electronic image stabilization).

In some embodiments, the camera 21 and the program 40 may include a zoom feature 70. The zoom feature 70 may allow the user to adjust the focal length between the camera 21 and target object. Accordingly, even when the user cannot return to a precise location where a previous image was captured, the user may align the camera 21 in an area adjacent the previous location and then adjust the focal length using the zoom feature 70 to frame the subsequent image similar to the previous image. In some embodiments, an automatic zoom may be used to align the camera 21. For example, the program 40 may use edge detection to detect and align similar objects between the preview 23 and the corresponding alignment overlay image.

In one or more embodiments of the present disclosure, the program 40 may further include a drawing or import feature. The import feature may allow a user to draw or superimpose or otherwise combine additional objects onto an image. For example, the import feature may allow the user to incorporate a graphic that is overlaid on the images of the project 30. The graphic may be overlaid on the images once the project is complete or during creation of the project. In some embodiments, the graphic may be moved between subsequent images. As an example, a graphic depiction of a sun may be superimposed on an initial image and may be used as a reference point for subsequent images. The sun may then be removed from the images, or may remain on the images in the project 30. In some embodiments, the sun may remain on some images in the project 30 and may be removed from other images in the project 30. As another example, a graphic depiction of the sun at various points in the sky (e.g., sunrise, noon, and sunset) may be used as an alignment overlay image and may be made available to multiple users, who may then each capture an image of the sun (and the surrounding skyline, for example), by aligning the graphic image of the sun with the real sun. A subsequently captured image may then be compiled with other images using the same alignment overlay image. Thus, a project may be formed of images from widely varying geographic locations, all of which were created by the same or similar alignment overlay images. Further, multiple images may be taken of the same object at varying times (e.g., the sun at sunrise, at noon, and at sunset) and may be consecutively arranged to show progression of the sun as captured by multiple users. It will be appreciated that the graphic image of the sun may remain on some or all of the images, or may be removed from some or all of the images after the corresponding image is captured.

One or more embodiments of the present disclosure may also be applied to error detection. For example, the camera 21 may be positioned adjacent an assembly line and may capture an image at a specified interval. An alignment overlay image may then be overlaid on the display 22 of the camera 21 and may be used to quickly monitor and detect deviations in products on the assembly line. As such, the alignment overlay image may be used for quality control of various products. Further, it will be appreciated that because the camera 21 does not need to be stationary, it may be used for quality control of products produced without an assembly line.

In some embodiments of the present disclosure, various operations may be performed by different components of the system. For example, a DSLR camera or a smartphone (or other mobile device) may include an image processor or other digital signal processor that is specialized to process digital images (such as the images captured by the camera). This image processor may be used to directly control the image sensor 21A based on instructions received from the processor. In addition, a DSLR camera or a smartphone may include a graphical processing unit (GPU) that is specialized to display images on a display. The GPU may be used to modify the alignment overlay image in order to, for example, reduce the opacity of the alignment overlay image or to generate an outline from the alignment overlay image. The GPU may also composite the alignment overlay image 20A over the preview 23 of image to be captured by the camera. In some systems, the image processor and/or the graphical processing unit is integrated with the processor and may be referred to as an application processor. As another example, the alignment overlay image 20A may be made visible in the viewfinder of the DSLR camera in addition to or instead of the separate display 23.

The system and method of aligning images may be applied to many different applications. For example, the system and method of aligning images may be used to create a tutorial, wherein the images of the project 30 relate to various steps of a process.

As an example, the system and method of aligning images may be used for training others, for example, for teaching proper form for fitness routines. As an example, referring to FIGS. 11A-11E, in some embodiments, a user (e.g., a fitness instructor) may create a project 130 demonstrating proper form of a lunge dip. To create the project 130, the user may capture a first image 120 of a person (e.g., a model) 101 standing in profile. The user may then use the method of aligning images according to one or more embodiments of the present disclosure to create a first alignment overlay image 120A corresponding to the first image 120, and may reference the first alignment overlay image 120A to capture a second image 122. The second image 122 may correspond to an intermediate lunge phase in the lunge dip, wherein the model 101 is in a split-leg position, with a front leg and a back leg that are both generally straight. The user may use a back foot 103 as the reference in the first alignment overlay image 120A and the second image 122 because the back foot 103 remains stationary (or substantially stationary) in both the first image and the second image. Using a second alignment overlay image 122A, the user may then capture a third image 124. The third image 124 may correspond to the "dip" phase in the lunge dip, wherein the model 101 is in the split-leg position with both knees bent. The user may use the back foot 103 as the reference in the second alignment overlay image 122A and the third image 124. Using a third alignment overlay image 124A, the user may then capture a fourth image 126. The fourth image 126 may correspond to a second intermediate lunge phase in the lunge dip, wherein the model 101 is in the split-leg position with both legs straight, similar to the position of the second image 122. Using a fourth alignment overlay image 126A, the user may then capture a fifth image 128, wherein the model 101 is returned to the standing profile position.

Figure 12A:
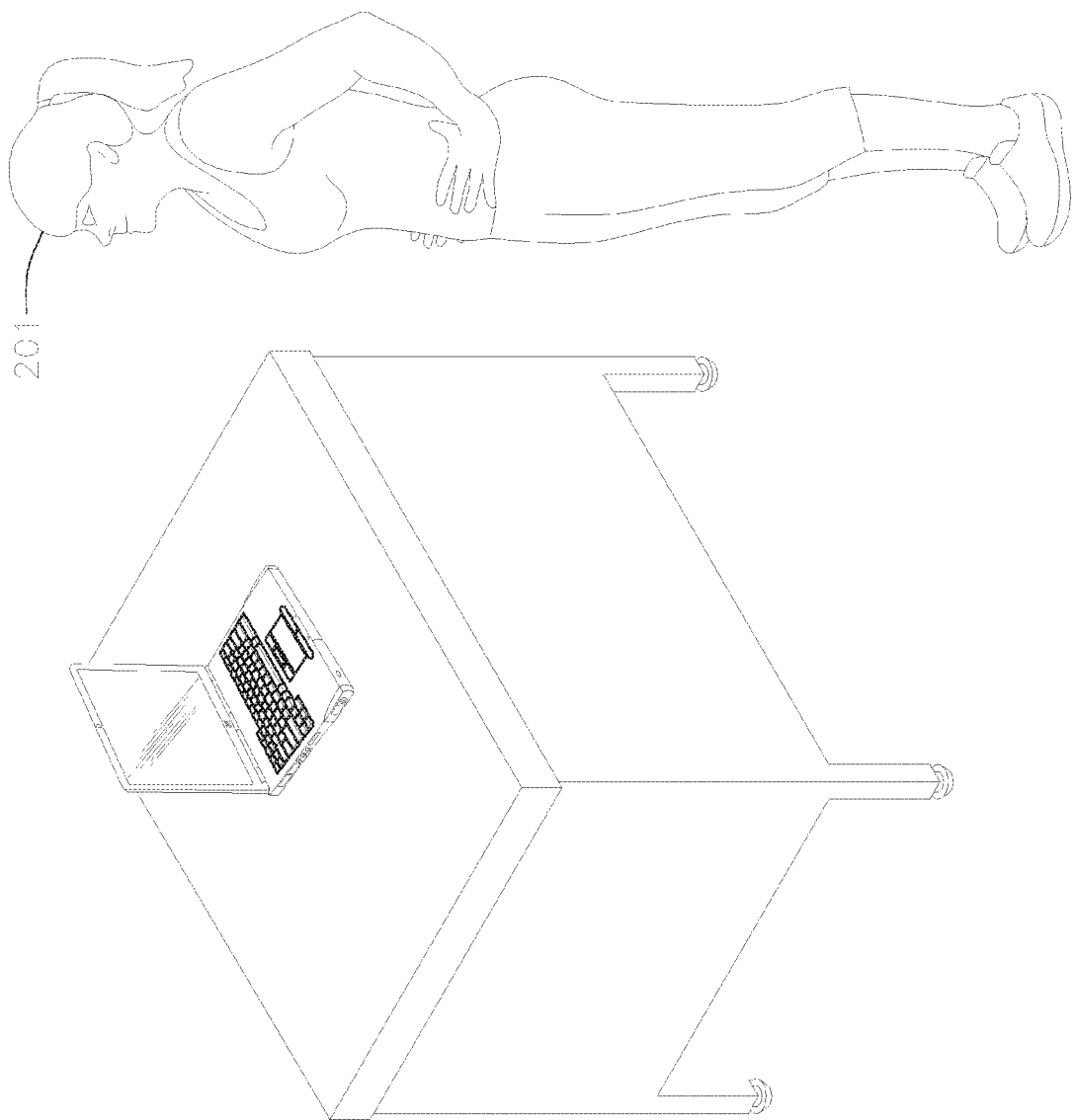
FIG. 12A is a view of a viewer reviewing a project according to one or more embodiments of the present disclosure.
Figure 14:
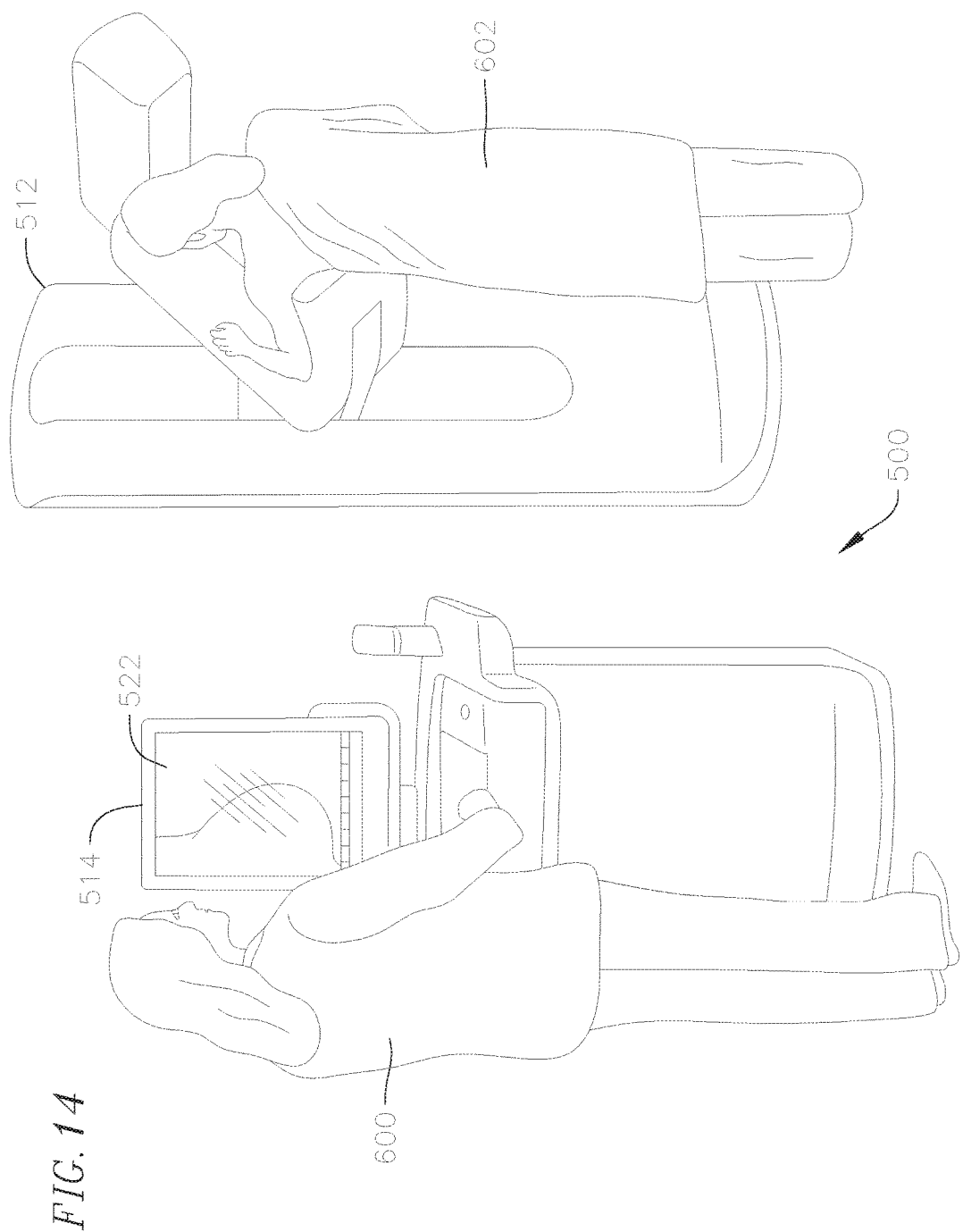
FIG. 14 is a schematic view of medical equipment utilizing an imaging system and method according to one or more embodiments of the present disclosure.

When the project 130 is uploaded to a feed 150 using the program 40, the project 130 may include the first through fifth images 120, 122, 124, 126, 128 at 100% opacity. A viewer 201 may then view the project 130 to acquire information about proper form of a lunge dip. Referring to FIGS. 12A and 12B, in some embodiments, the viewer 201 may obtain (e.g., download) the project 130 and use any of the images as an alignment overlay image as a reference when performing a lunge dip. For example, by using a camera 110 (e.g., a front-facing camera) and a display 112 (e.g., a screen), the user may view her movements on the display 112. By overlaying one or more of the images from the project 130 on the display 112, the user may align herself with the model 101 to improve her form during the exercise.

As discussed above, the alignment overlay image may be presented at a reduced opacity, as a blacked out figure, etc. For example, the model 101 may be blacked out in the alignment overlay image.

When a user opens or activates or accesses the program 40, in some embodiments, the program 40 may present the user with a priming question before accessing additional content of the program 40. The priming question may be configured to influence user behavior by providing a perceived incentive for using the program 40. For example, the priming question may include a "yes" or "no" statement, such as, "I want to share my story," accompanied by a "yes" button and a "no" button. To access content of the program 40, the user must engage either the yes or no button. The priming question thus engages the user and provides a greater sense of ownership and direction for the user to prepare or continue a project 30. In some embodiments, the priming question may be used upon initial use of the program 40, and in other embodiments the priming question may be presented at a later point in time. In some embodiments, when the user selects "yes," the program 40 will activate the generation mode, and when the user selects "no," the program 40 will activate the presentation mode. As other examples of priming questions, in some embodiments the priming question may include "I want to share interesting content with my network," and in some embodiments the priming question may include "I want to create interesting content." These priming questions may increase the likelihood that the user will share projects 30 or create projects 30, respectively.

In one or more embodiments, the program 40 may be configured to link to online retail establishments. For example, a project 330 may include a series of images illustrating various stages of a painting. The program 40 may include a direct link between the project 330 and an online retail store or website where the painting may be purchased. A link to the appropriate website may be embedded in the project 330, and when a user engages any portion of the project 330 besides the transport controller, the user may be directed to the external link. In some embodiments, the program 40 may be utilized on the retailer's webpage, such that engaging the project 330 redirects to a point of purchase within the same link or URL.

In one or more embodiments, the camera system and method of aligning and/or comparing images may be applied to the medical field. For example, the camera system and method may be utilized to create a tutorial for a medical procedure, such as instructions for performing a lumbar puncture, a peripheral intravenous ("IV") placement, a phlebotomy, cardio-pulmonary resuscitation ("CPR"), orotracheal intubation, nasogastric tube placement, incision and drainage of a superficial abscess, obtaining an arterial blood gas ("ABG"), debriding a superficial wound, suturing a superficial laceration and/or incision, maintaining ventilation with a bag valve mask, subclavian line placement, internal jugular line placement, intraosseous access for IV fluid, chest tube placement, performing a thoracentesis, performing a two-handed tie, performing a one-handed tie, performing an instrument tie, performing a subcuticular closure, performing a simple interrupted closure, interpreting a plain abdominal X-ray, preparing and draping a sterile field, making a skin incision, and/or using a skin stapler, as non-limiting examples.

In one or more embodiments, the camera system and method may be applied to medical apparatus. It will be appreciated that although reference is made to a "camera system," embodiments of the present disclosure may be applied to imaging equipment, as discussed further below. For clarity, such a system and method are described as an imaging system and method, but it will be appreciated that the camera system described above may be readily applied to any suitable imaging equipment. As non-limiting examples, the imaging system may be applied to any one of an X-ray radiology film study, magnetic resonance imaging ("MRI"), positron emission tomography ("PET") scan, X-ray computer tomography (X-ray CT) and computerized axial tomography scan (CAT scan), ultrasound scan, echocardiogram scan, Doppler echocardiogram, and mammogram scan, but the present invention is not limited thereto or thereby. Similarly, the imaging equipment may be any one of X-ray equipment, MRI equipment, PET scanner, CT scanner, ultrasound equipment, an echocardiography machine, and mammography machines, but the present invention is not limited thereto or thereby.

Referring to FIGS. 13, 14, 15A-15C, and 16 a first imaging procedure is performed using imaging equipment 500 (S300). For convenience of explanation, FIGS. 14 and 15A-15C illustrate an exemplary embodiment where the first imaging procedure is a mammogram scan and the imaging equipment 500 is a mammography machine. The imaging equipment 500 includes an imager 512, a display 514, and a processor 516 having a memory 518. It will be appreciated that the imager 512 will vary according to the imaging equipment 516 that is used. For example, in an MRI machine, the imager 512 may include the scanner in conjunction with one or more magnets, in a CT scanner, the imager 512 may include an x-ray source and digital x-ray detectors, in a mammography machine, the imager 512 may include an x-ray source and a digital x-ray detector, etc. The imager 512 is used to provide an image.

A user 600, for example, a technician, a nurse, a physician, etc., may access the imager 512 of the imaging equipment 500 to obtain a first image (or a baseline image) 520 (S310). In one or more embodiments, imager 512 includes an image sensor 532A (e.g., a CMOS sensor or a CCD sensor) that is used to capture an image, a lens that is configured to focus light onto the image sensor, and the display 514. The imager 512 can be controlled by a processor 516, which is connected to the imager 512 via a bus 515 (e.g., a peripheral bus). Similarly, the display 514 is coupled to the processor 516 via the bus 515 so that the processor 516 can supply image signals to the display 514.

In some embodiments, the display 514 is configured to provide a preview 522 (e.g., a live preview) of an image (e.g., a target image) before the image is captured (e.g., captured by the imager 512). In other words, the display 514 allows the user 600 to view the target image prior to capturing the target image. The display 514 is also configured to display a previously captured (or imported) image. It will be appreciated that the display 514 is configured to display a previously captured (or imported) image and the preview 522 concurrently. Once the baseline image 520 is obtained, the baseline image 520 is stored in (or on) the memory 518 (e.g., a computer data storage) (S320).

Next, referring to FIG. 15B, to facilitate performing a second imaging procedure (e.g., an imaging procedure of the same type as the first imaging procedure, but at a later point in time), the baseline image 520 is recalled and overlaid (or projected or made visible) at a reduced opacity on the preview 522 on the display 514, thereby generating a first overlay image 520A (S330). The opacity may be selected such that the preview 522 is not fully obstructed (e.g., remains distinguishable from the first overlay image 520A) when the first overlay image 520A and the preview 522 are concurrently displayed on the display 514, yet the first overlay image 520A is still visible on the display 514. For example, the first overlay image 520A may have an opacity of about 40-50%.

Much like the display 22 discussed above with respect to the camera system and method, the display 514 of the present embodiment provides the preview 522 of a second image 524 while performing the second imaging procedure. Because the first overlay image 520A is overlaid on the preview 522 such that both the first overlay image 520A and the preview 522 are presented on the display 514, the user 600 may refer to the first overlay image 520A to align a reference (e.g., an object or objects, a common object or objects, a common profile, etc.). In some embodiments, the reference may be common to the first overlay image 20A and the second image 524. As such, the imager 512 may be positioned according to the reference such that the reference is similarly oriented between the baseline image 520 and the second image 524. For example, the imager 512 may be positioned in substantially the same location relative to the location where the baseline image 520 was captured during the second imaging procedure, without the need for external aligning equipment, such as a tripod. Similarly, when the imager 512 is stationary, a patient 602 may be positioned relative to the imager 512 such that the reference is similarly oriented between the baseline image 520 and the second image 524 (or between the first imaging procedure and the second imaging procedure).

It will be appreciated that the reference may include any suitable object to achieve the desired alignment. For example, the user 600 may reference a constant body part of the patient 602, such as a bone, an organ, a blemish, etc. As another example, the reference may be a common profile or silhouette, such as an outline of the patient 602. Further, because the first overlay image 520A is at a reduced opacity (e.g., a 40% opacity), the user 600 may reference the objects in the first overlay image 520A while still being able to view the preview 522. It will be appreciated that a user may optionally use the first overlay image 520A to "match" common objects between the baseline image 520 and the second image 524, and/or may optionally use the first overlay image 520A as a guide for alignment, with or without regard to matching or including common features. In some embodiments, the first overlay image 520A may be generated and stored in the memory 518 along with the baseline image 520.

Referring to FIGS. 13 and 15C, the second imaging procedure may be performed using the imaging equipment 500 (S340). The first overlay image 520A may be overlaid (or superimposed) on the display 514 of the imaging equipment 500 (S350) which enables alignment of the imager 512 (or the patient 602) during the second imaging procedure (S360). For example, the user 600 may reference one or more common objects (or similar objects) in the first overlay image 520A and the preview 522 to align or substantially align the common objects in the baseline image 520 and the preview 522. As illustrated in FIG. 15B when the imager 512 and the patient 602 are not in an aligned configuration, a duplicate of some of the common objects on the display 514 may be visible because the preview 522 and the first overlay image 520A are not in alignment. However, as illustrated in FIG. 15C, when the imager 512 and the patient 602 are in the aligned configuration, the common objects align (or stack on each other) such that the duplicate that is present during a process of aligning is no longer visible (or substantially no longer visible).

Once the imager 512 and the patient 602 are aligned, the second image 524 is captured (S370). The second image 524 is then stored in the memory 518 (S380). It will be appreciated that although in some embodiments, alignment of the imager 512 refers to precise alignment and overlapping of subsequent images, the present disclosure is not limited thereto or thereby. As another example, once the imager 512 and the patient 602 are aligned, the user 600 may then compare the baseline image 520 (i.e., the first overlay image 520A) and the preview 522 on the display 514 and assess any changes, growth, abnormalities, etc. between the first overlay image 520A and the preview 522 on the display 514. As such, the imaging system and method may be used to quickly and easily track changes, abnormalities, growth, etc. (or lack thereof) at distinct points in time. Accordingly, medical professionals may ascertain any change in size, shape, consistency, contrast in any lesion, any growth of tumors and propagation of fractures, etc. by utilizing the imaging system and method.

The above-described process may be repeated to conduct any number of imaging procedures (e.g., to capture any number of data points, to capture additional images, to compare additional displays, etc.). For example, during a third imaging procedure, a second overlay image 524A corresponding to the second image 524 but having a reduced opacity may be overlaid on the preview 522 of a third image 526 on the display 514. Once the imager 512 and the patient 602 are aligned, the third image 526 may be captured and stored in the memory 518, or the user 600 may use the preview 522 and the second overlay image 524A to compare objects at a third point in time during the third imaging procedure.

While this disclosure has been described in detail with particular references to some exemplary embodiments thereof, the exemplary embodiments described herein are not intended to be exhaustive or to limit the scope of the disclosure to the exact forms disclosed. It is understood that the drawings are not necessarily to scale. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and their equivalents.

What is claimed is:

1. A display system for presenting a series of aligned images, the display system comprising:
   a processor;
   a display coupled to the processor;
   a user interface device for sending a signal to the processor; and
   a memory storing instructions that, when executed by the processor, cause the processor to:
      store a plurality of images in the memory;
      assign values to each of the images according to an order of the images from among the plurality of images in the memory, such that a first value corresponds to a first image and a second value corresponds to a second image, the first image being ordered before the second image;
      correlate the values to portions of a transport controller;
      display the first image and the transport controller on the display;
      receive an input from the user interface device corresponding to a portion of the transport controller corresponding to the second value; and
      display the second image according to the input.

2. The display system of claim 1, wherein the transport controller comprises a virtual button that is slidable along a virtual bar on the display.

3. The display system of claim 1, wherein the user interface device comprises a mouse, a touch screen integrated with the display, a touchscreen external to the display, a track ball, or a stylus.

4. The display system of claim 1, wherein the transport controller is a virtual button that is slidable along a circular path.

5. The display system of claim 4, wherein one revolution of the transport controller displays each of the images of the plurality of images.

6. The display system of claim 1, wherein the plurality of images are each displayed at their native resolutions.

* * * * *